(12) United States Patent
Niroumandrad et al.

(10) Patent No.: US 11,478,089 B2
(45) Date of Patent: Oct. 25, 2022

(54) CONNECTION APPARATUS FOR PROVIDING AN INCLINED DISPLAY OF A VEHICLE

(71) Applicants: Hosein Niroumandrad, Daly City, CA (US); Pei Wang, Oakland, CA (US)

(72) Inventors: Hosein Niroumandrad, Daly City, CA (US); Pei Wang, Oakland, CA (US)

( * ) Notice: Subject to any disclaimer, the term of this patent is extended or adjusted under 35 U.S.C. 154(b) by 584 days.

(21) Appl. No.: 16/543,530

(22) Filed: Aug. 17, 2019

(65) Prior Publication Data
US 2021/0045549 A1 Feb. 18, 2021

(51) Int. Cl.
*A47F 7/04* (2006.01)
*F16M 13/00* (2006.01)

(52) U.S. Cl.
CPC .............. *A47F 7/04* (2013.01); *F16M 13/00* (2013.01)

(58) Field of Classification Search
CPC ......... A47F 7/04; B62D 43/00; B62D 43/007; F16M 13/00; B60D 1/48; B60B 30/00
USPC .................. 211/23, 24, 41.7; 248/346.01; 224/42.24, 42.26; 206/304; 280/288.4
See application file for complete search history.

(56) References Cited

U.S. PATENT DOCUMENTS

| | | | | | |
|---|---|---|---|---|---|
| 1,505,761 | A | * | 8/1924 | Adams | A47F 7/04 211/24 |
| 1,519,751 | A | * | 12/1924 | Erle | B62D 43/02 301/85 |
| 1,865,298 | A | * | 6/1932 | Beach | A47F 7/04 211/23 |
| 1,886,549 | A | * | 11/1932 | Howell | A47F 7/04 211/20 |
| 1,931,080 | A | * | 10/1933 | Nehls | B62D 43/007 224/42.25 |
| 1,964,119 | A | * | 6/1934 | Hendry | B66F 5/00 211/23 |
| 2,015,422 | A | * | 9/1935 | Ellenberger | B62D 43/00 224/42.24 |
| 2,635,795 | A | * | 4/1953 | White | B62D 43/002 224/42.26 |
| 2,772,826 | A | * | 12/1956 | Krengel | B62D 43/02 224/403 |
| 2,831,622 | A | * | 4/1958 | Bacca | B62D 43/08 280/727 |
| 3,302,836 | A | * | 2/1967 | Herndon | B62D 43/02 224/42.24 |
| 3,330,455 | A | * | 7/1967 | Cooper | B62D 43/02 224/523 |

(Continued)

*Primary Examiner* — Jennifer E. Novosad
(74) *Attorney, Agent, or Firm* — Jingming (James) Cai; SAC Attorneys LLP

(57) ABSTRACT

A method and a vehicle-to-vehicle connector assembly including a first wheel stand and a second wheel stand are provided. Each of the first wheel stand and the second wheel stand comprises a wheel hub attachment, a holder, and a bracket comprising a first end and a second end. The first end of the bracket is attached to a perimeter of the wheel hub attachment and the holder is attached to the second end of the bracket. The holder includes a tubular channel with angled internal walls. The holder of the first wheel stand is perpendicular to a second leg of the first wheel stand, and the holder of the second wheel stand is perpendicular to a second leg of the second wheel stand. A rod member is slidably inserted in the tubular channel of the first wheel stand and the tubular channel of the second wheel stand.

12 Claims, 23 Drawing Sheets

(56) References Cited

U.S. PATENT DOCUMENTS

| | | | | |
|---|---|---|---|---|
| 3,425,605 A | * | 2/1969 | Triboulet | B62D 43/02 224/535 |
| 3,428,230 A | * | 2/1969 | Korf | B62D 43/02 224/531 |
| 3,547,258 A | * | 12/1970 | Black | A47F 7/04 211/23 |
| 3,894,668 A | * | 7/1975 | Chapman | B62D 43/02 224/500 |
| 3,940,959 A | * | 3/1976 | Anderson | B62D 43/007 70/259 |
| 3,990,618 A | * | 11/1976 | Shattuck | B62D 43/08 211/23 |
| 4,007,863 A | * | 2/1977 | Norris | B62D 43/08 211/23 |
| 4,089,449 A | * | 5/1978 | Bayne | B62D 43/08 248/309.2 |
| 4,161,267 A | * | 7/1979 | Morrison, Jr. | B62D 43/02 224/42.25 |
| 4,212,417 A | * | 7/1980 | Scott | B62D 43/08 414/466 |
| 4,366,923 A | * | 1/1983 | Koch | B62D 43/08 224/403 |
| 4,386,722 A | * | 6/1983 | Gearhart | B62D 43/04 414/463 |
| 4,434,919 A | * | 3/1984 | Flowers | B62D 43/02 414/463 |
| 4,498,614 A | * | 2/1985 | Guarr | B60R 11/06 224/42.13 |
| 4,573,587 A | * | 3/1986 | Matthews, Jr. | A47F 7/04 248/172 |
| 4,679,717 A | * | 7/1987 | Hansen | B62D 43/02 224/512 |
| 4,684,310 A | * | 8/1987 | Stange | B60B 29/001 414/785 |
| 4,751,833 A | * | 6/1988 | Stumpf, Jr. | F16B 41/005 70/229 |
| 4,869,409 A | * | 9/1989 | Wright | B62D 43/02 414/466 |
| 4,915,274 A | * | 4/1990 | Oliver | B62D 43/02 414/463 |
| 4,948,021 A | * | 8/1990 | Murphy | B62D 43/02 224/532 |
| 4,993,609 A | * | 2/1991 | Flint | B62D 43/005 224/42.2 |
| 5,054,648 A | * | 10/1991 | Luoma | E01F 9/70 414/439 |
| 5,102,022 A | * | 4/1992 | Knezovich | B62D 43/007 224/42.25 |
| 5,213,297 A | * | 5/1993 | Laskowski | A47F 7/04 248/172 |
| 5,236,756 A | * | 8/1993 | Halliburton | E01F 5/005 156/95 |
| 5,259,578 A | * | 11/1993 | Jones | A47C 5/005 297/440.13 |
| 5,303,569 A | * | 4/1994 | Wright | B62D 43/007 224/42.25 |
| 5,388,737 A | * | 2/1995 | Myers | B62D 43/02 224/42.25 |
| 5,427,287 A | * | 6/1995 | Harrison | B62D 43/02 224/42.21 |
| 5,678,796 A | * | 10/1997 | James | E04H 6/04 224/558 |
| 6,062,396 A | * | 5/2000 | Eason | A47F 7/04 211/20 |
| 6,116,483 A | * | 9/2000 | MacKarvich | B62D 43/02 224/518 |
| 6,427,885 B1 | * | 8/2002 | Dexel | B62D 43/007 224/42.25 |
| 6,499,607 B1 | * | 12/2002 | Fijalkowski | A47F 7/04 211/23 |
| 6,739,641 B2 | * | 5/2004 | McLeod | B29C 70/82 296/37.2 |
| 6,749,094 B1 | * | 6/2004 | Dexel | B62D 43/007 224/42.25 |
| 6,866,282 B2 | * | 3/2005 | Heerspink | B62H 3/08 211/20 |
| 7,861,902 B2 | * | 1/2011 | Osenkowski | B62D 43/002 224/42.21 |
| 7,922,048 B2 | * | 4/2011 | Smith | B60Q 1/2661 296/37.2 |
| 8,596,322 B2 | * | 12/2013 | Stoila | B29D 30/2607 211/23 |
| 2002/0050500 A1 | * | 5/2002 | Vasseur | B62D 43/08 224/42.21 |
| 2002/0056737 A1 | * | 5/2002 | Eberle | B62D 43/02 224/42.21 |
| 2002/0187029 A1 | * | 12/2002 | Obriot | B62D 43/04 414/463 |
| 2003/0201633 A1 | * | 10/2003 | Bernard | B62D 67/00 280/762 |
| 2004/0222261 A1 | * | 11/2004 | Wilson | B62D 43/002 224/42.21 |
| 2004/0232093 A1 | * | 11/2004 | Atkinson | A47F 7/04 211/23 |
| 2005/0040296 A1 | * | 2/2005 | Rosa | A47F 7/04 248/124.1 |
| 2008/0296239 A1 | * | 12/2008 | Hurd | A47F 7/04 211/23 |
| 2009/0032481 A1 | * | 2/2009 | Stukenberg | A47G 1/1646 211/41.7 |
| 2013/0008066 A1 | * | 1/2013 | de Martigny | B60B 30/04 40/606.03 |
| 2017/0157979 A1 | * | 6/2017 | Polka | B60B 7/068 |
| 2020/0290399 A1 | * | 9/2020 | James | B66F 7/0625 |
| 2021/0045549 A1 | * | 2/2021 | Niroumandrad | A47F 7/00 |

\* cited by examiner

CONNECTION APPARATUS FOR PROVIDING AN INCLINED DISPLAY OF A VEHICLE

BACKGROUND

The booming automobile industry has given rise to automotive trade fairs where popular and upcoming automobiles are displayed. In a typical automotive trade fair, various media people, consumers and businessmen participate. Automobile manufacturers, for example, car manufacturers, also participate in automotive trade fairs to demonstrate their cars. However, in a typical automotive trade fair scenario, the car is usually parked on its wheels on a platform. The car remains stationary on the platform allowing access to just the passenger compartment, engine bay and boot. Therefore, the existing automotive trade fair scenarios do not provide a stylistic display of the car to the people, as the vehicle remains stationary on the platform. Vehicle display ramps are used to display a car in a variety of stylistic display configurations. However, structures of such vehicle display ramps are made of metal tubes to support the weight of the car being displayed. Therefore, the structures of the vehicle display ramps are usually larger than the car being displayed on them. Accordingly, a viewer is unable to completely appreciate the beauty of the displayed car and the stylistic display configuration in which the car is displayed. Furthermore, vehicle display ramps are usually designed to display a single car.

Hence there exists a long felt but unresolved need of an apparatus and a method for stylistically displaying cars in an automotive trade fair. There also exists a need for a compact and discrete apparatus for stylistically displaying a car without affecting the beauty of the displayed car. There also exists a need for an apparatus capable of displaying two inclined cars side by side of each other. There also exists a need for an apparatus capable of displaying a car in an inclined position to demonstrate strength and characteristics of the displayed car, for example, strength of the car chassis and engine layout.

SUMMARY OF THE INVENTION

This summary is provided to introduce as election of concepts in a simplified form that are further disclosed in the detailed description of the invention. This summary is not intended to determine the scope of the claimed subject matter.

The method and the vehicle-to-vehicle connector assembly disclosed herein addresses the above recited need for an apparatus for stylistically displaying vehicles. As used here, vehicle refers to a transportation vehicle comprising three wheels, four or more wheels, etc., that are capable of being supported by the wheels of the vehicle without requiring a support device, for example, vehicular stand, etc. Examples of such vehicles comprise cars, sports utility vehicles, pickup trucks, etc. The vehicle-to-vehicle connector assembly comprises a first wheel stand and a second wheel stand. The first and second wheel stands address the above recited need for a compact and discrete apparatus for stylistically displaying a vehicle without affecting the beauty of the displayed vehicle. The vehicle-to-vehicle connector assembly addresses the above recited need for an apparatus capable of displaying two inclined vehicle side by side of each other. The vehicle-to-vehicle connector assembly also addresses the above recited need for an apparatus capable of displaying a vehicle in an inclined position to demonstrate strength and characteristics of the displayed vehicle, for example, strength of the vehicular chassis and engine layout of the vehicle.

Each of the first wheel stand and the second wheel stand comprises a wheel hub attachment, a bracket and a holder. A first end of the bracket is attached to a perimeter of the wheel hub attachment. The bracket comprises a first leg attached substantially perpendicular to the perimeter of said wheel hub attachment. The bracket further comprises a second leg connecting the first leg and the holder. The second leg is connected to the first leg at an angle. The holder is attached perpendicularly to the second leg of the bracket. The holder includes a channel with angled internal walls. The channel is a tubular channel. As used herein, the terms "channel" and "tubular channel" are interchangeably used in the specification. A rod member having an angular cross-section is slidably inserted into the tubular channel of the first wheel stand and the tubular channel of the second wheel stand to connect the first wheel stand and the second wheel stand. The angular cross-section of the rod member corresponds to the shape of the tubular channel of the first wheel stand and the tubular channel of the second wheel stand. The rod member further comprises a first hole located on a first end and a second hole located on a second end of the rod member. The rod member further comprises a first retaining pin and a second retaining pin configured to be inserted into the first hole located on the first end and the second hole located on the second end of the rod member.

In an embodiment, a single vehicle-to-vehicle connector assembly is used to stylistically display two inclined vehicles side by side of each other by attaching the first wheel stand to a wheel hub of a first inclined vehicle, attaching the second wheel stand to a wheel hub of a second inclined vehicle, and establishing a rigid connecting between the first and second wheel stands. In this embodiment, either the front and rear wheel hubs on the inclined side of the first inclined vehicle are in-line with the front and rear wheel hubs on the inclined side of the second inclined vehicle, or the rear and front wheel hubs on the inclined side of the first vehicle are in-line with the front and rear wheel hubs on the inclined side of the second vehicle. In an embodiment, the first inclined vehicle and the second inclined vehicle face the same direction and the vehicle-to-vehicle connector assembly is used to connect either the front wheel hubs or the rear wheel hubs on the inclined sides of the first inclined vehicle and the second inclined vehicle. In another embodiment, the first inclined vehicle faces a direction opposite to the direction of the second inclined vehicle and the vehicle-to-vehicle connector assembly connects the rear wheel hub on the inclined side of the first inclined vehicle with the front wheel hub on the inclined side of the second inclined vehicle. Alternatively, the vehicle-to-vehicle connector assembly is used to connect the front wheel hub on the inclined side of the first inclined vehicle with the rear wheel hub on the inclined side of the second inclined vehicle.

In an embodiment, the first inclined vehicle and the second inclined vehicle are stylistically displayed side by side of each other using two vehicle-to-vehicle connector assemblies, for example, a first vehicle-to-vehicle connector assembly and a second vehicle-to-vehicle connector assembly. In an embodiment, the first inclined vehicle and the second inclined vehicle face the same direction. The first vehicle-to-vehicle connector assembly and the second vehicle-to-vehicle connector assembly are used to connect the front wheel hubs and the rear wheel hubs, respectively, on the inclined sides of the first inclined vehicle and the second inclined vehicle. In another embodiment, the first inclined vehicle faces a direction opposite to the direction of the second inclined vehicle. The first vehicle-to-vehicle connector assembly is used to connect the rear wheel hub on the inclined side of the first inclined vehicle with the front wheel hub on the inclined side of the second inclined vehicle. The second vehicle-to-vehicle connector assembly is used to connect the front wheel hub on the inclined side of the first inclined vehicle with the rear wheel hub on the inclined side of the second inclined vehicle.

In another embodiment, a single vehicle-to-vehicle connector assembly is used to stylistically display two inclined vehicles that are offset from each other. As used herein offset refers to the position of the first and second inclined vehicles where either the front wheel hub or rear wheel hub on the inclined side of the first vehicle is in-line with either the rear wheel hub or front wheel hub, respectively, on the inclined side of the second vehicle. In an embodiment, the first inclined vehicle and the second inclined vehicle face the same direction with the front wheel hub on the inclined side of the first vehicle in-line with the rear wheel hub on the inclined side of the second vehicle. The vehicle-to-vehicle connector assembly is used to connect the front wheel hub on the inclined side of the first vehicle with the rear wheel hub on the inclined side of the second vehicle. In another embodiment, the front wheel hub on the inclined side of the second vehicle is in-line with the rear wheel hub on the inclined side of the first vehicle. The vehicle-to-vehicle connector assembly is used to connect the front wheel hub on the inclined side of the second vehicle with the rear wheel hub on the inclined side of the first vehicle.

In another embodiment, the first and second inclined vehicles that are offset from each other face opposite directions. In an embodiment, the front wheel hub on the inclined side of the first vehicle is in-line with the front wheel hub on the inclined side of the second vehicle, and the vehicle-to-vehicle connector assembly is used to connect the front wheel hub on the inclined side of the first vehicle with the front wheel hub on the inclined side of the second vehicle. In another embodiment, the rear wheel hub on the inclined side of the second vehicle is in-line with the rear wheel hub on the inclined side of the first vehicle, and the vehicle-to-vehicle connector assembly is used to connect the rear wheel hub on the inclined side of the second vehicle with the rear wheel hub on the inclined side of the first vehicle.

In the embodiments describe attaching the vehicle-to-vehicle connector assembly to the wheel hubs of the inclined first vehicle and the inclined second vehicle. In another embodiment, the first wheel stand and the second wheel stand of the vehicle-to-vehicle connector assembly are individually attached to the wheel hub of the the first vehicle and the second vehicle prior to inclining the first and second vehicles and connect the first wheel stand and the second wheel stand using the rod member. In another embodiment, the first vehicle and the second vehicle are inclined prior to attaching the first wheel stand to the wheel hub of the first vehicle and the wheel hub of the second vehicle, and the first wheel stand and the second wheel stand are connected using the rod member.

A method for providing inclined display of vehicles is provided. The method utilizes a single vehicle-to-vehicle connector assembly. The method comprises attaching the first wheel stand to the wheel hub of the first vehicle. The method further comprises attaching the second wheel stand to the wheel hub of the second vehicle. The wheel hub of the first vehicle is, for example, the left side rear wheel hub. The wheel hub of the second vehicle is, for example, the right side rear wheel hub. A wheel mounted on the left side rear wheel hub of the first vehicle is removed prior to attaching the first wheel stand to the wheel hub of the first vehicle. Similarly, a wheel mounted on the right side rear wheel hub of the second vehicle is removed prior to attaching the second wheel stand to the wheel hub of the second vehicle. Examples of the first and second vehicles comprise four wheeled vehicles such as cars, sports utility vehicles, etc. The wheels are mounted on top of the first wheel stand and the second wheel stand after attaching the first wheel stand and the second wheel stand to the wheel hub of the first vehicle and the wheel hub of the second vehicle. The method further comprises inclining the first vehicle and the second vehicle; aligning the channel of the first wheel stand with the channel of the second wheel stand; and slidably inserting the angled rod member in the channel of the first wheel stand and the channel of the second wheel stand.

The method further comprises inserting the first retaining pin into the first hole located on the first end of the rod member. The method further comprises inserting the second retaining pin into the second hole located on the second end of the rod member.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific method sand components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
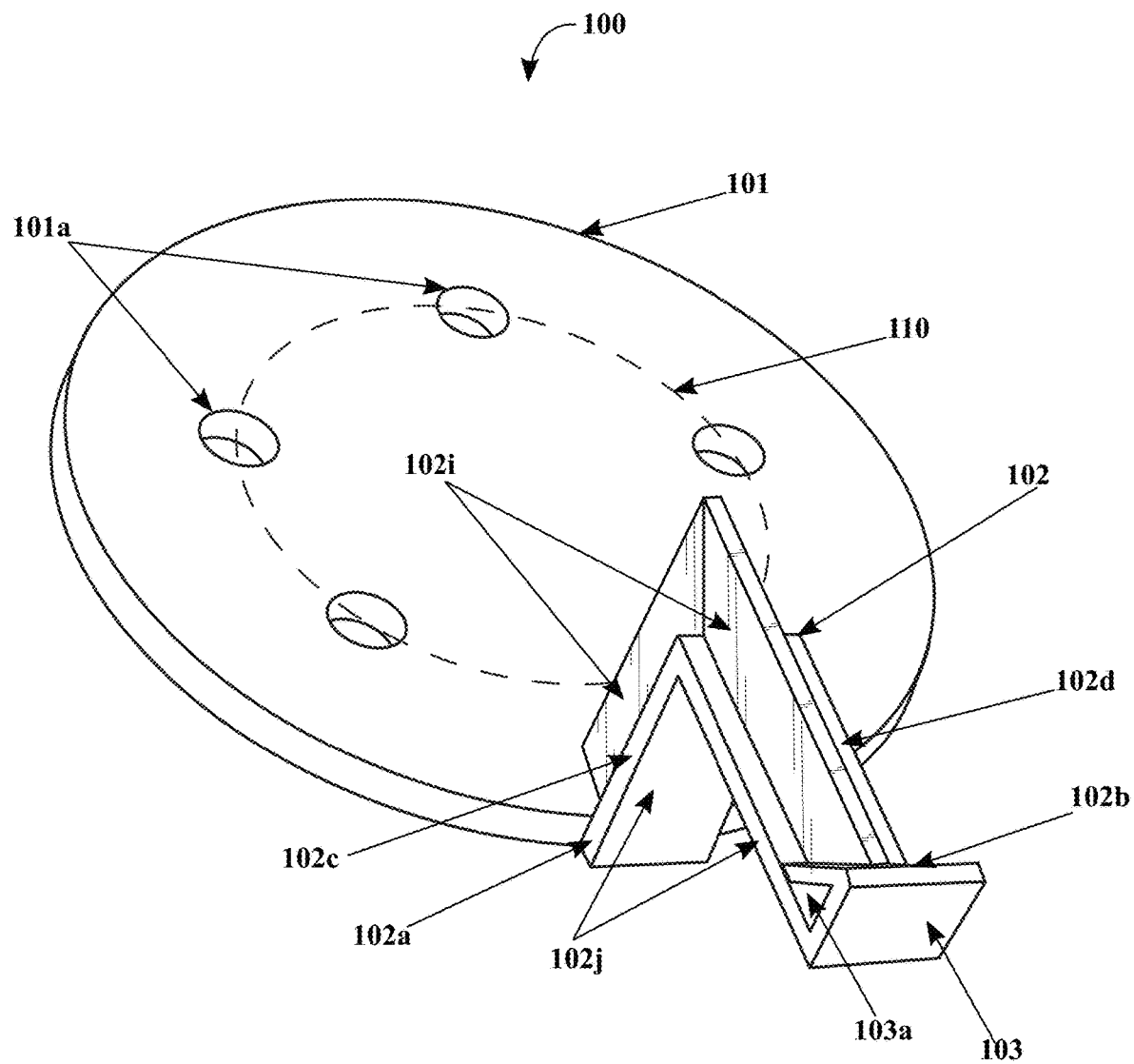
FIG. 1 illustrates a perspective view of an embodiment of a wheel stand comprising a wheel hub attachment having five holes for mounting on a wheel hub comprising five hub lugs.
Figure 6A:
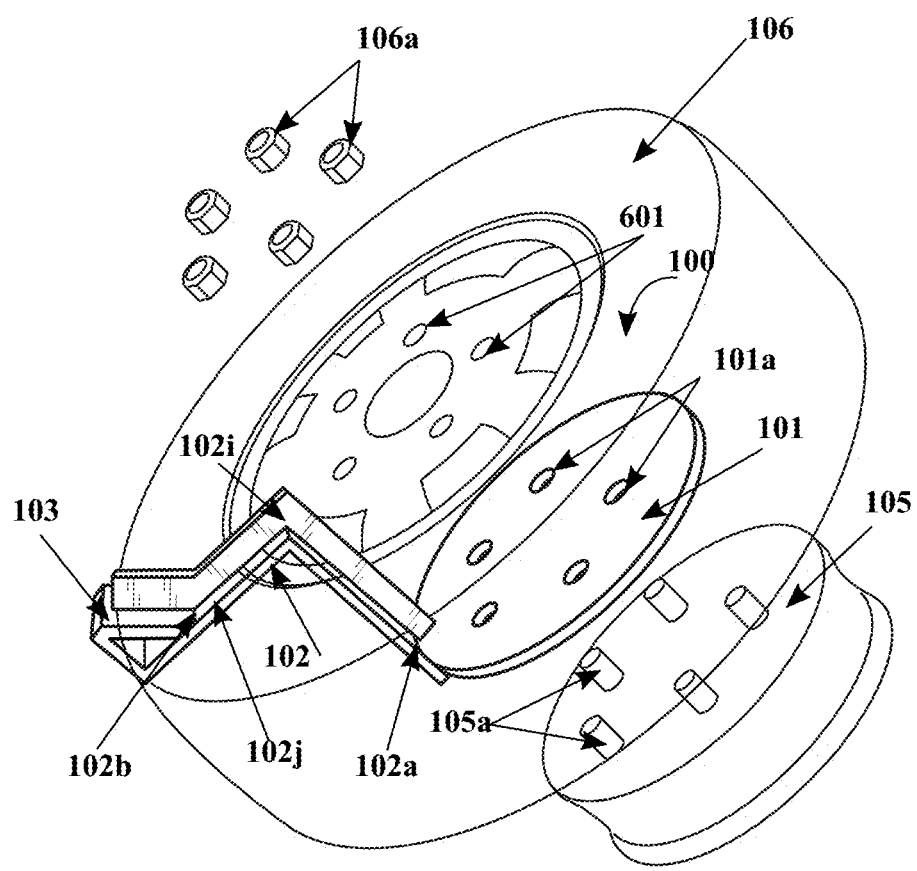
FIG. 6A illustrates an exploded view showing an embodiment of the wheel stand comprising a wheel hub attachment having five holes for mounting on a wheel hub comprising five hub lugs.

FIG. 1 illustrates a perspective view of an embodiment of a wheel stand 100 comprising a wheel hub attachment 101 having five holes 101a for mounting on a wheel hub 105 comprising five hub lugs 105a, as illustrated in FIG. 6A. As illustrated in FIG. 1, the wheel stand 100 further comprises a bracket 102 and a holder 103. The bracket 102 comprises a first end 102a and a second end 102b. The first end 102a of the bracket 102 is attached to a perimeter of the wheel hub attachment 101. The holder 103 is attached to the second end 102b of the bracket 102. The holder 103 comprises a channel 103a. The channel 103a comprises angled internal walls. The internal walls of the channel 103a are internally angled. The channel is a tubular channel. As used herein, the terms "channel" and "tubular channel" are interchangeably used in the specification.

In an embodiment, the bracket 102 comprises a first leg 102c and a second leg 102d. The first leg 102c is attached substantially perpendicular to the perimeter of the wheel hub attachment 101. The second leg 102d connects the first leg 102c to the holder 103. The second leg 102d is connected to the first leg 102c at an angle, for example, a right angle. The holder 103 is attached perpendicularly to the second leg 102d of the bracket 102.

Figure 5A:
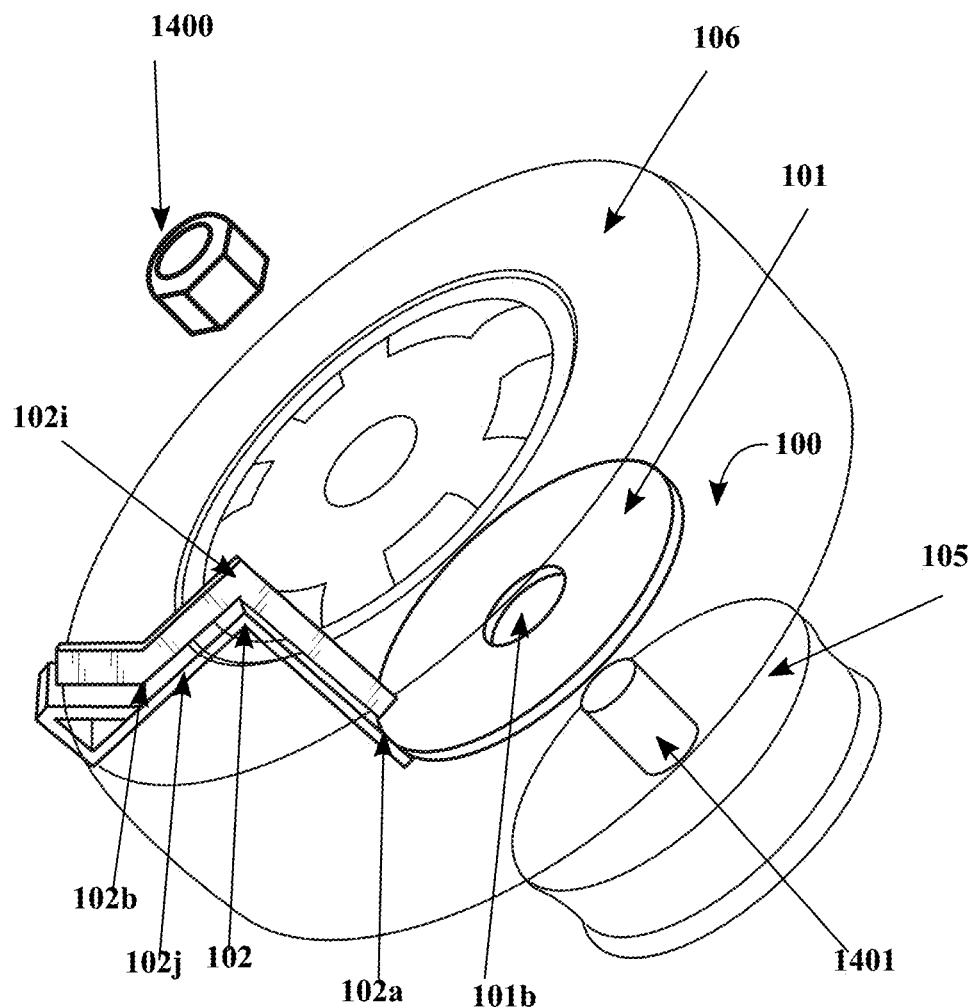
FIG. 5A illustrates an exploded view showing an embodiment of the wheel stand comprising a central hole for mounting the wheel stand on a vehicle equipped with a central hub lug on the wheel hub.
Figure 5B:
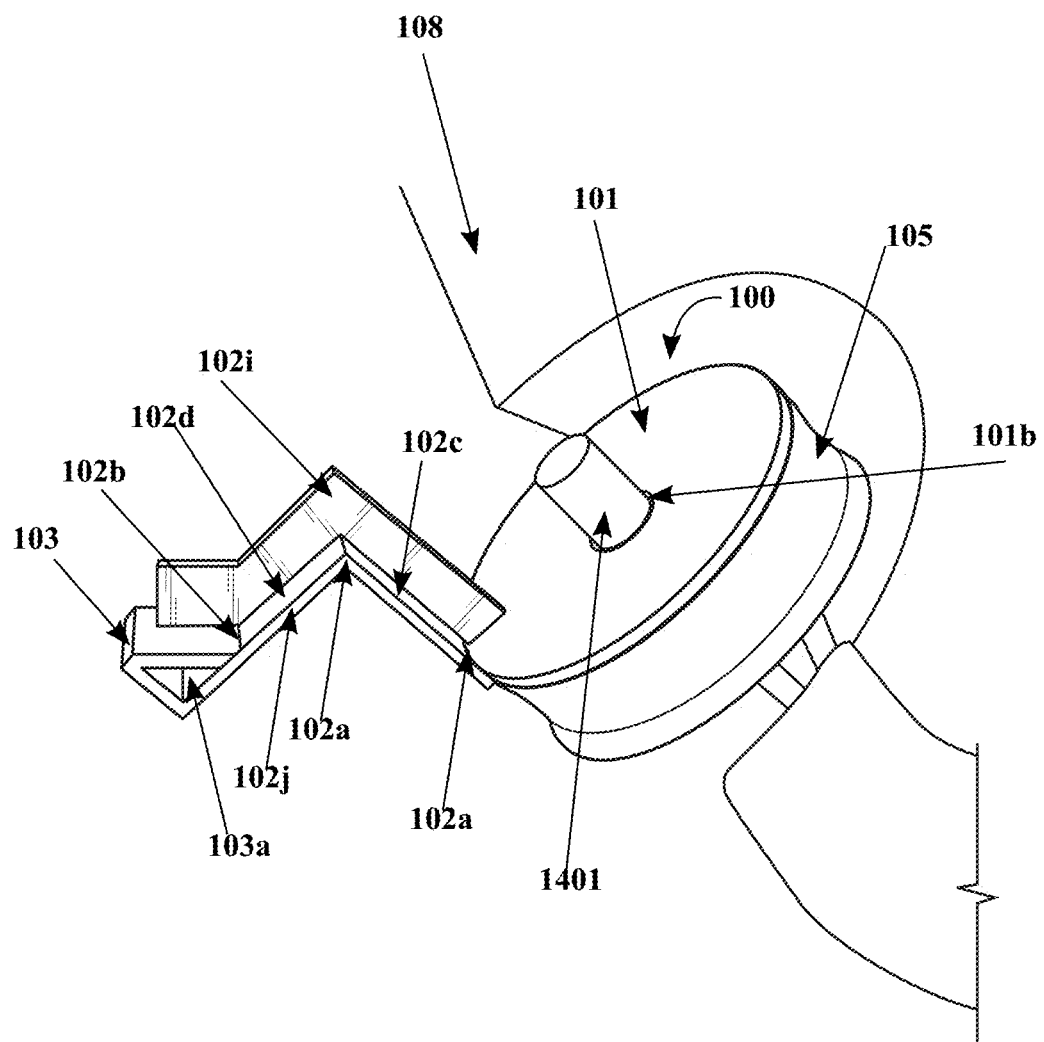
FIG. 5B illustrates a perspective view of an embodiment of the wheel stand, comprising a central hole on the wheel hub attachment, mounted on a wheel hub comprising a central hub lug.
Figure 5C:
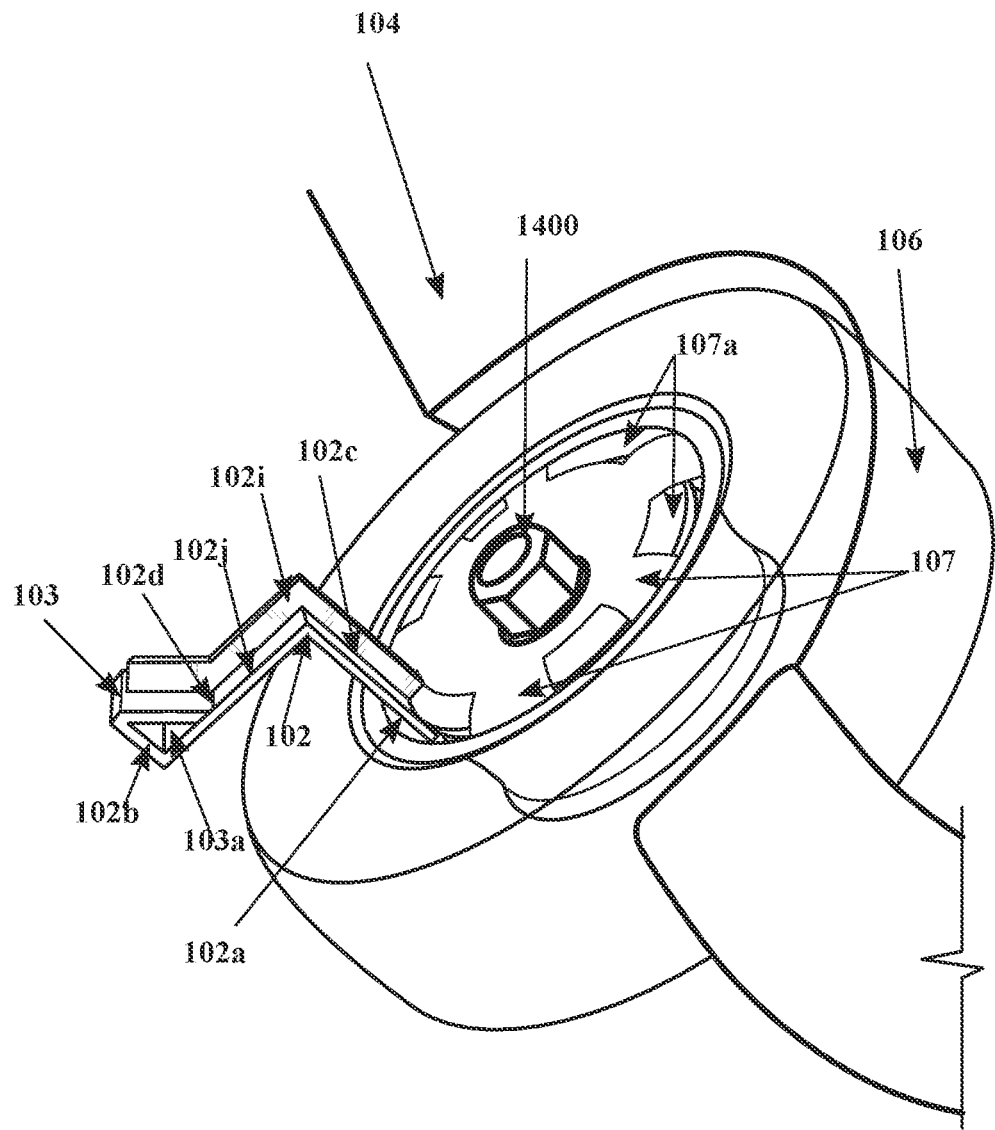
FIG. 5C illustrates a perspective view of an embodiment of the wheel stand, comprising a central hole fastened to the wheel hub along with a wheel using a single lug nut, with a bracket protruding out of a gap between wheel spokes of the wheel.
Figure 6B:
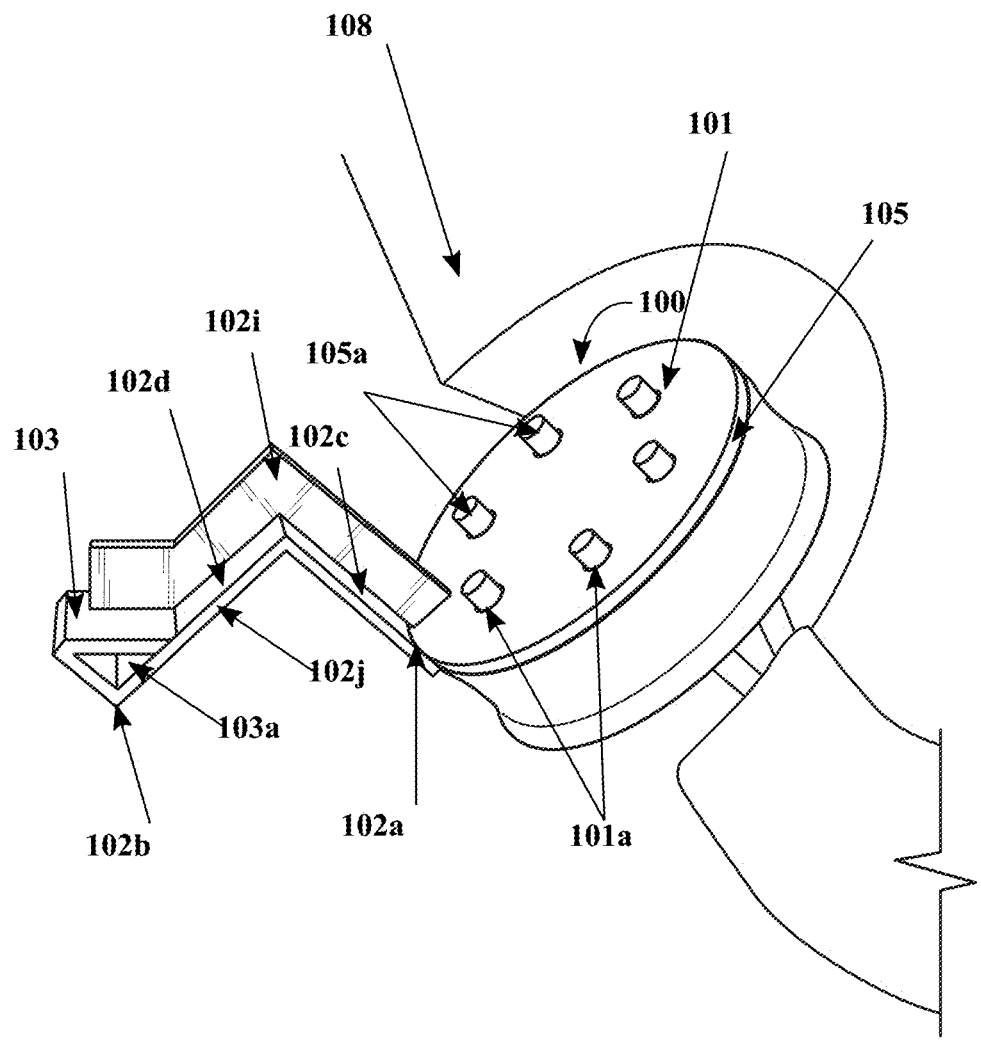
FIG. 6B illustrates a perspective view of an embodiment of the wheel stand, comprising a wheel hub attachment having five holes, mounted on a wheel hub comprising five hub lugs.

As used here, a vehicle 108 and 109, exemplarily illustrated in FIGS. 5B, 5C, 6B, 6C, 9, and 14-16, refers to a transportation vehicle comprising three wheels, four or more wheels, etc., that are capable of being supported by the wheels of the vehicle without requiring a support device, for example, vehicular stand, etc. Examples of such vehicles comprise cars, sports utility vehicles, pick-up trucks, etc. As used herein, hub lugs 105a, as shown in FIGS. 6A and 6B refer to wheel studs on a wheel hub 105 of a vehicle 108 and 109 used to mount and fasten a wheel 106 of a vehicle 108 and 109.

Figure 2:
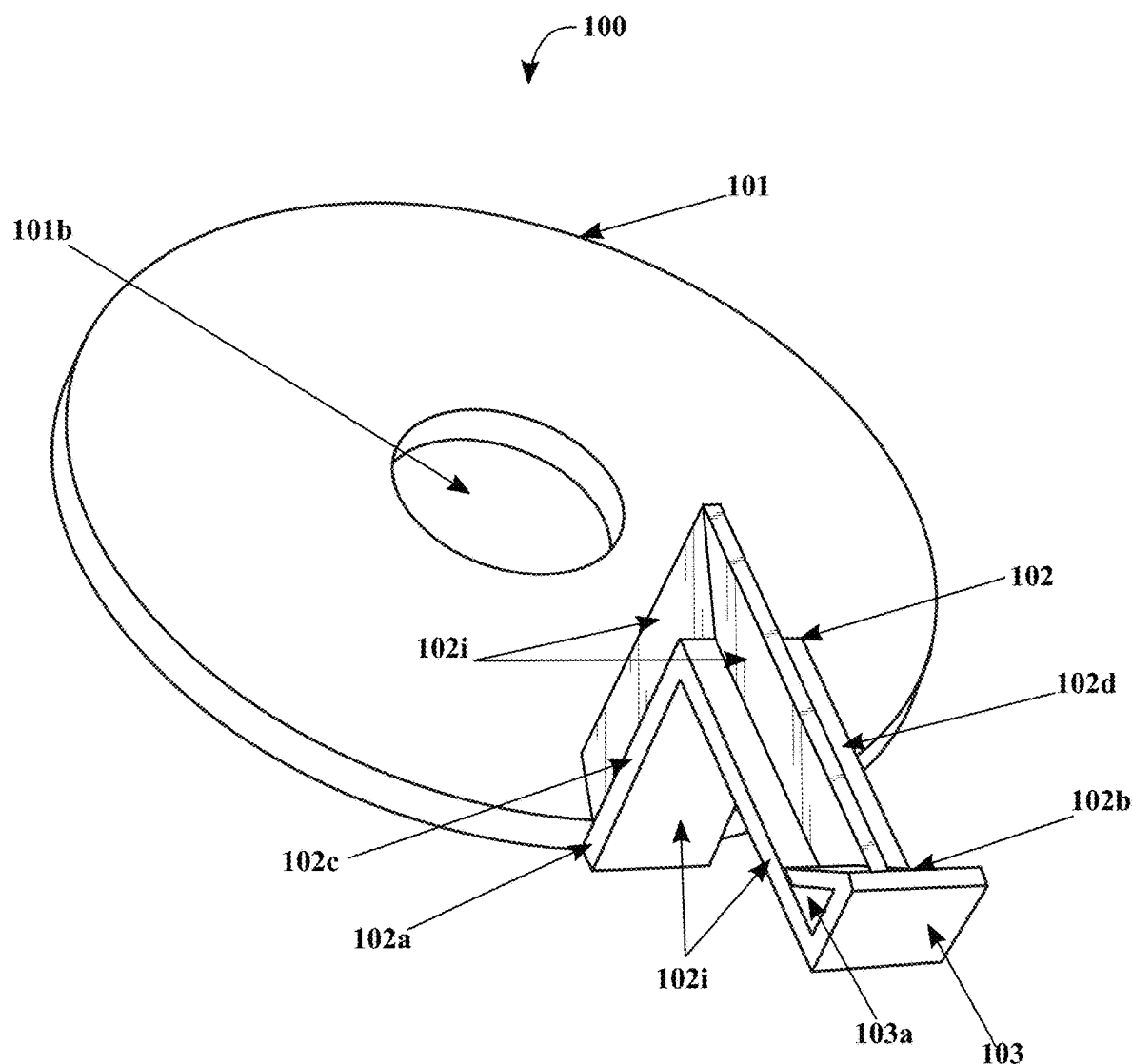
FIG. 2 illustrates a perspective view of another embodiment of the wheel stand comprising a wheel hub attachment having a central hole for attaching to a wheel hub comprising a central hub lug.

In an embodiment, the wheel hub attachment 101 is a circular shaped wheel hub attachment. FIG. 2 illustrates a perspective view of an embodiment of the wheel stand 100 comprising a wheel hub attachment 101 having a central hole 101b for attaching to a wheel hub 105 comprising a central hub lug 1401. As exemplarily illustrated in FIGS. 5A-5C, for vehicles comprising a single hub lug 1401 and a single lug nut 1400, for example, a centre-lock wheel comprising a single central hub lug 1401 located on a centre of the wheel hub 105 of the vehicle, the wheel hub attachment 101 of the wheel stand 100 is mounted on the central hub lug 1401. The wheel 106 is mounted on top of the wheel hub attachment 101. The wheel 106 and the wheel stand 100 are fastened to the wheel hub 105 using the single lug nut 1400. Examples of vehicles that use a single hub lug 1401 and a single lug nut 1400 comprise 2019 McLaren Senna prototype manufactured by McLaren Automotive of Surrey, United Kingdom. Each of the front wheels 106 of the 2019 McLaren Senna prototype uses a single lug nut 1400 to fasten the front wheel 106 to the wheel hub 105.

Figure 3:
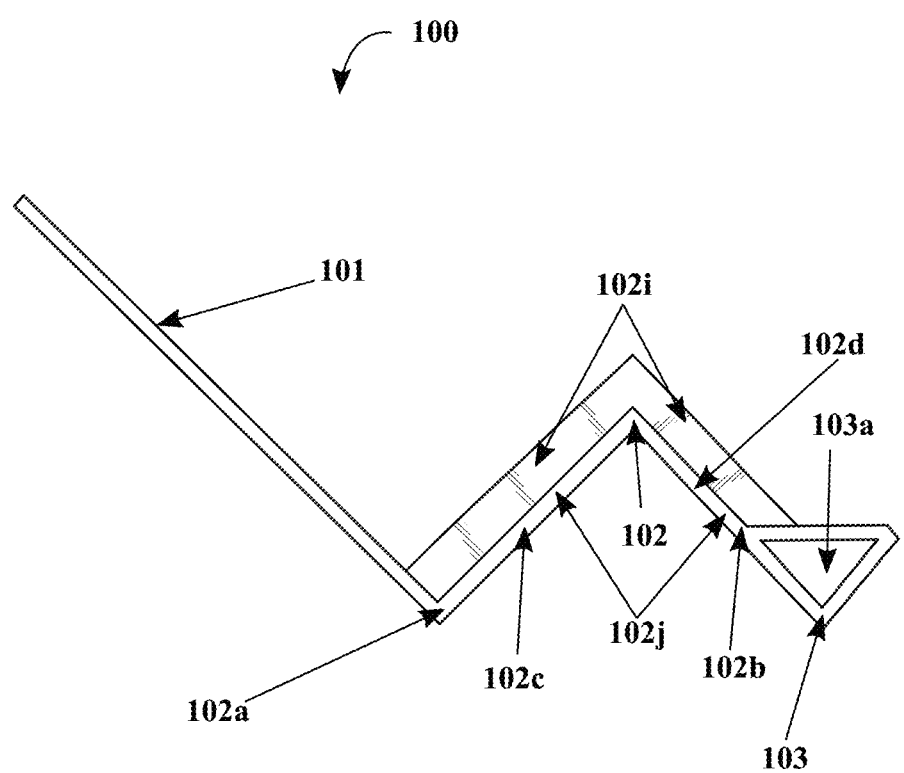
FIG. 3 illustrates a front view of an embodiment of the wheel stand.
Figure 4:
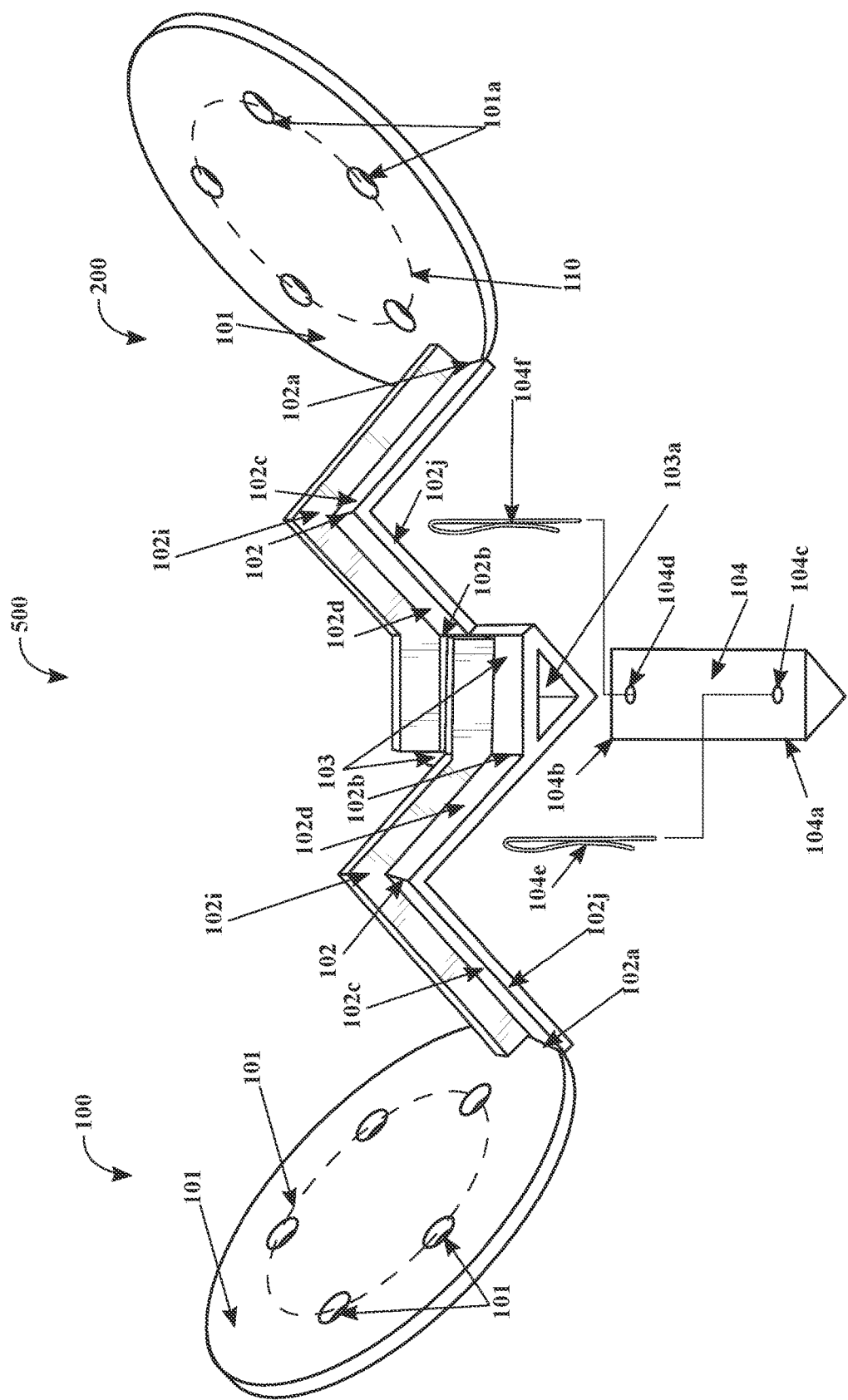
FIG. 4 illustrates a perspective view of an embodiment of a vehicle-to-vehicle connector assembly in which channels of the first wheel stand and a second wheel stand are aligned.

As illustrated in the embodiment of FIG. 1, in the wheel stand 100 comprising a wheel hub attachment 101 having five holes 101a for mounting on a wheel hub 105 comprising five hub lugs 105a. FIG. 3 illustrates a front view of an embodiment of the wheel stand 100. FIG. 4 illustrates a perspective view of an embodiment of a vehicle-to-vehicle connector assembly 500 in which channels of the first wheel stand 100 and a second wheel stand 200 are aligned. In the embodiment of FIG. 4, the wheel hub attachment 101 comprises a plurality of holes 101a defined through the wheel hub attachment 101. The holes 101a are constructed as circular cross-section bores. The holes 101a are located along a circular path 110, as illustrated in FIGS. 1 and 4. The circular path 110 is concentric to the circular shaped wheel hub attachment 101.

As exemplarily illustrated in FIG. 4, the vehicle-to-vehicle connector assembly comprises the first wheel stand 100 and a second wheel stand 200. Here, each of the first wheel stand 100 and the second wheel stand 200 comprises a wheel hub attachment 101, a bracket 102 and a holder 103. Further, each of the brackets 102 comprises a first end 102a and a second end 102b. The first end 102a of the bracket 102 is attached to a perimeter of the wheel hub attachment 101 and the holder 103 is located at the second end 102b of the bracket 102. The holder 103 comprises a channel 103a comprising angled internal walls. As exemplarily illustrated in FIG. 4, the channel of the first wheel stand 100 is aligned with the channel of the second wheel stand 200 as disclosed in the detailed description of FIG. 7.

A rod member 104 comprising an angular cross-section is slidably inserted into the channels 103a of the first wheel stand 100 and the second wheel stand 200. The angular cross-section of the rod member 104 corresponds to the shape of the channel 103a of the first wheel stand 100 and the channel (not shown) of the second wheel stand 200. The angular cross-section of the rod member 104 is, for example, a triangular cross-section, as illustrated in FIG. 3. In an embodiment, the angular cross-section of the rod member 104 is, for example, a square shaped cross-section, a pentagonal shaped cross-section, etc. As exemplarily illustrated in FIG. 8, the channel 103a of the first wheel stand 100 and the channel (not shown) of the second wheel stand 200 receive the rod member 104 with just enough sufficient free play to allow the rod member to slide in and out of the channel 103a of the first wheel stand 100 and the channel (not shown) of the second wheel stand 200. However, the free play is not sufficient enough to allow the first wheel stand 100 to move tangentially with respect to the second wheel stand 200 and the rod member.

The angular cross-section of the rod member 104 corresponds to the shape of the channel 103a of the first wheel stand 100 and the channel (not shown) of the second wheel stand 200. As exemplarily illustrated in FIG. 4, the rod member 104 further comprises a first hole 104c located on a first end 104a and a second hole 104d located on a second end 104b of said rod member 104. The first hole 104c and the second hole 104d extend through the entire thickness of the rod member 104. A first retaining pin 104e and a second retaining pin 104f are configured to be inserted into the first hole 104c and the second hole 104d, respectively. Examples of retaining pins 104e and 104f comprise hairpin cotter, SLIC pins, pull ring detent pins, ball knob detent pins, lynch pins, carabiners, wire lock pins, ring pins, bent arm pins, etc.

In an embodiment, the first leg 102c and the second leg 102d both comprise an inverted T-shaped cross-section, as shown in FIGS. 1-3. A vertically-oriented (vertical) fin 102i and a horizontally-oriented (planar) fin 102j form the first leg 102c and the second leg 102d having the inverted T-shaped cross-section. The planar fin 102j is located below a lower end of the vertical fin 102i. The planar fin 102j located below is rigidly attached to the vertical fin 102i. The vertical fin 102i prevents the planar fin 102j from bending, and increases structural strength and rigidity of the wheel stand 100.

FIG. 5A illustrates an exploded view showing the embodiment of the wheel stand 100 comprising the central hole 101b for mounting the wheel stand 100 on a vehicle 108 equipped with a central hub lug 1401 on the wheel hub 105. The wheel stand 100 is configured to be mounted on the central hub lug 1401 located on the wheel hub 105 of the vehicle 108 by slidably inserting the central hub lug 1401 through the central hole 101b. FIG. 5B illustrates a perspective view showing the wheel stand 100 mounted on the wheel hub 105 comprising the central hub lug 1401. FIG. 5C illustrates a perspective view of the wheel stand 100 fastened to the wheel hub 105 along with a wheel 106 using a single lug nut 1400, with the bracket 102 of the wheel stand 100 protruding out of a gap 107a between wheel spokes 107 of the wheel 106.

Figure 6C:
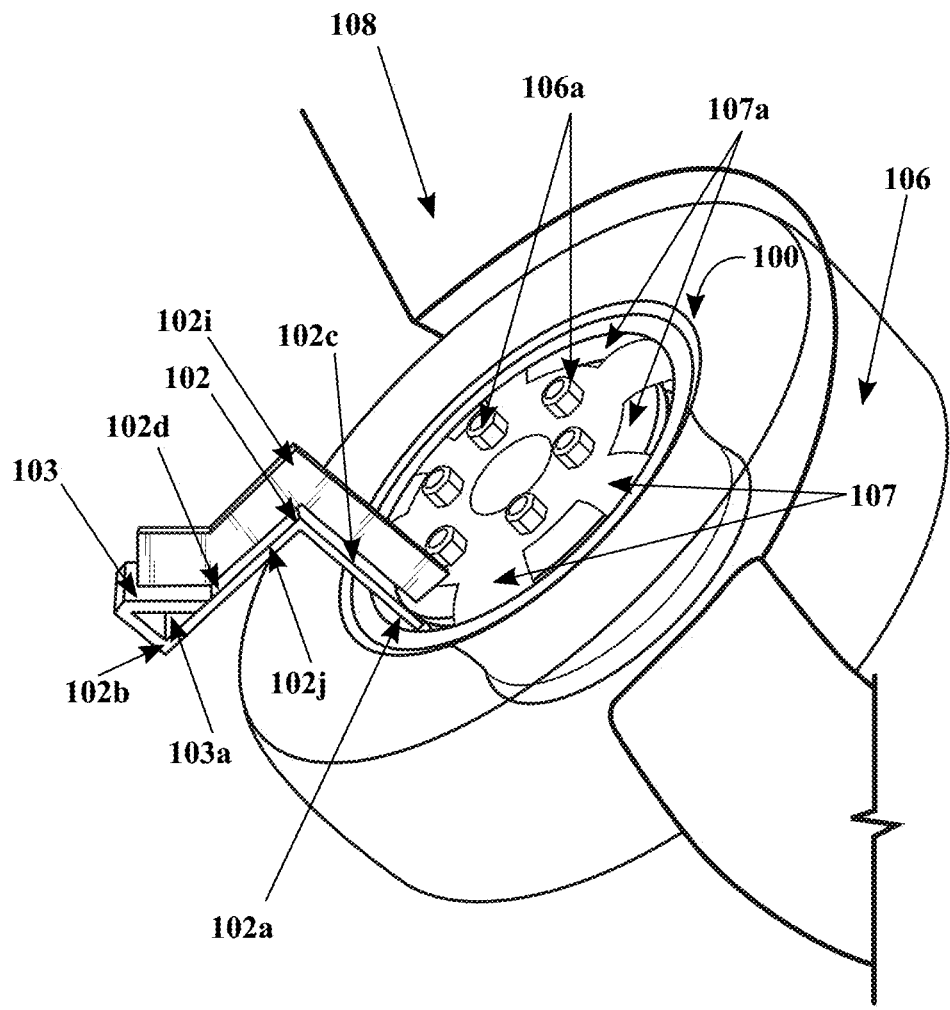
FIG. 6C illustrates a perspective view of an embodiment of the wheel stand, comprising a wheel hub attachment having five holes, fastened to the wheel hub along with a wheel using five lug nuts, with a bracket protruding out of a gap between wheel spokes of the wheel.

FIG. 6A illustrates an exploded view of the embodiment of the wheel stand 100 comprising a wheel hub attachment 101 having five holes 101a for mounting the wheel stand 100 on a wheel hub 105 comprising five hub lugs 105. The embodiment of the wheel stand 100 shown in FIGS. 1, 4, 6A and 6B is mounted on a vehicle comprising five hub lugs 101a. Examples of vehicles comprising five hub lugs on their wheel hub 105 comprise Ferrari California T manufactured by Ferrari S.p.A. of Maranello, Italy; Porsche Boxster manufactured by Porsche AG, Germany, etc. In an embodiment, the wheel stand 100 comprises a wheel hub attachment 101 having more than five holes 101a. In an embodiment, the wheel stand 100 comprises a wheel hub attachment 101 having fewer than five holes 101a. The holes 101a on the wheel hub attachment 101 are constructed as circular cross-section bores. The holes 101a are located along a circular path 110 as shown in FIGS. 1 and 4. The circular path 110 is concentric to the circular shaped wheel hub attachment 101. FIG. 6C illustrates a perspective view of the wheel stand 100, comprising a wheel hub attachment 101 having five holes 101a, fastened to the wheel hub 105 along with a wheel 106 using five lug nuts 106a. As shown in FIG. 6C, the bracket of the wheel stand 100 protrudes out of a gap 107a between wheel spokes 107 of the wheel 106.

Figure 7:
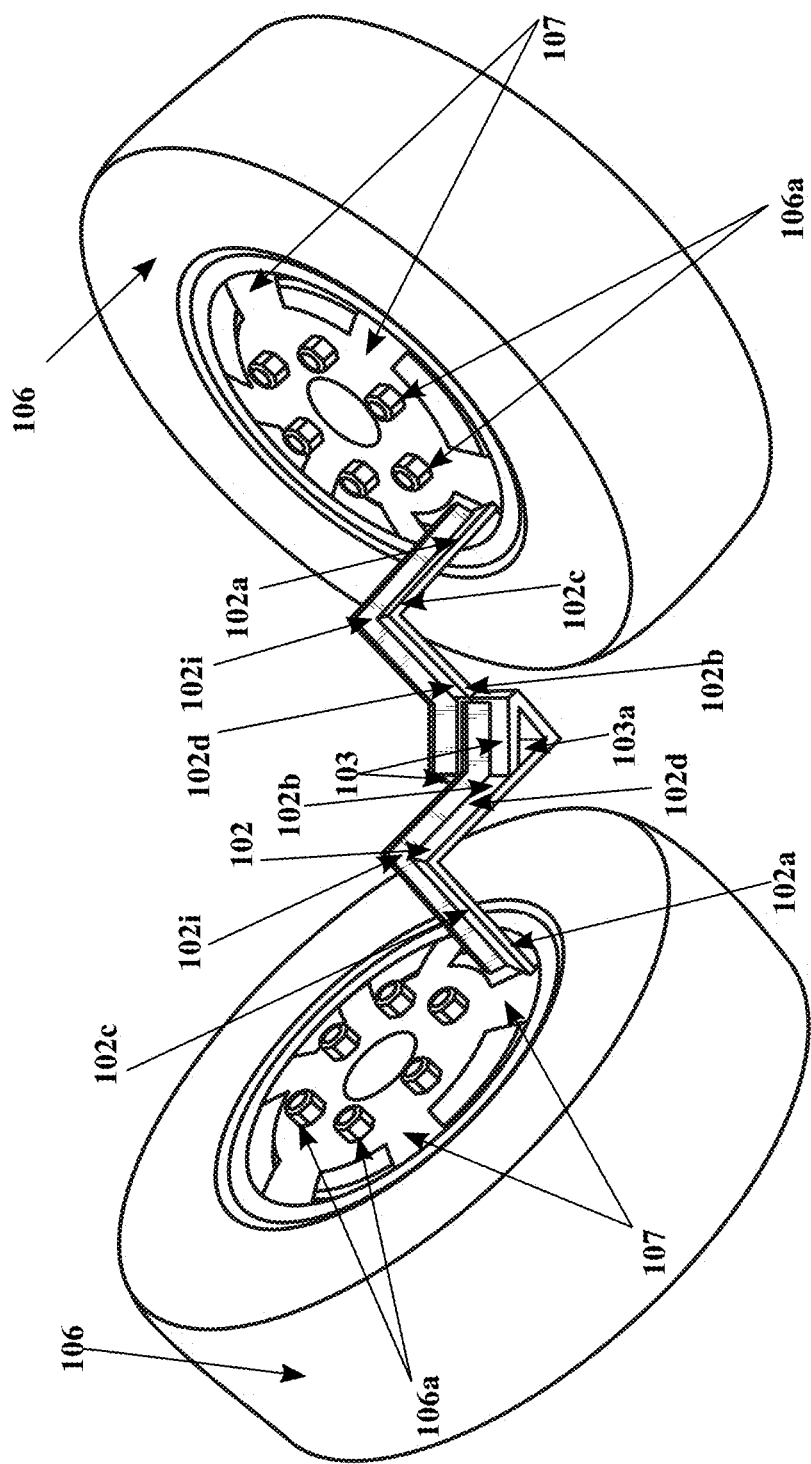
FIG. 7 illustrates a perspective view of alignment of channels of the first wheel stand and the second wheel stand.

FIG. 7 illustrates a perspective view of alignment of the channel 103a of the first wheel stand 100 and the channel (not shown) of the second wheel stand 200. In an embodiment, the channel (not shown) of the second wheel stand 200 is of a similar shape and size as that of the channel 103a of the first wheel stand 100.

Figure 8:
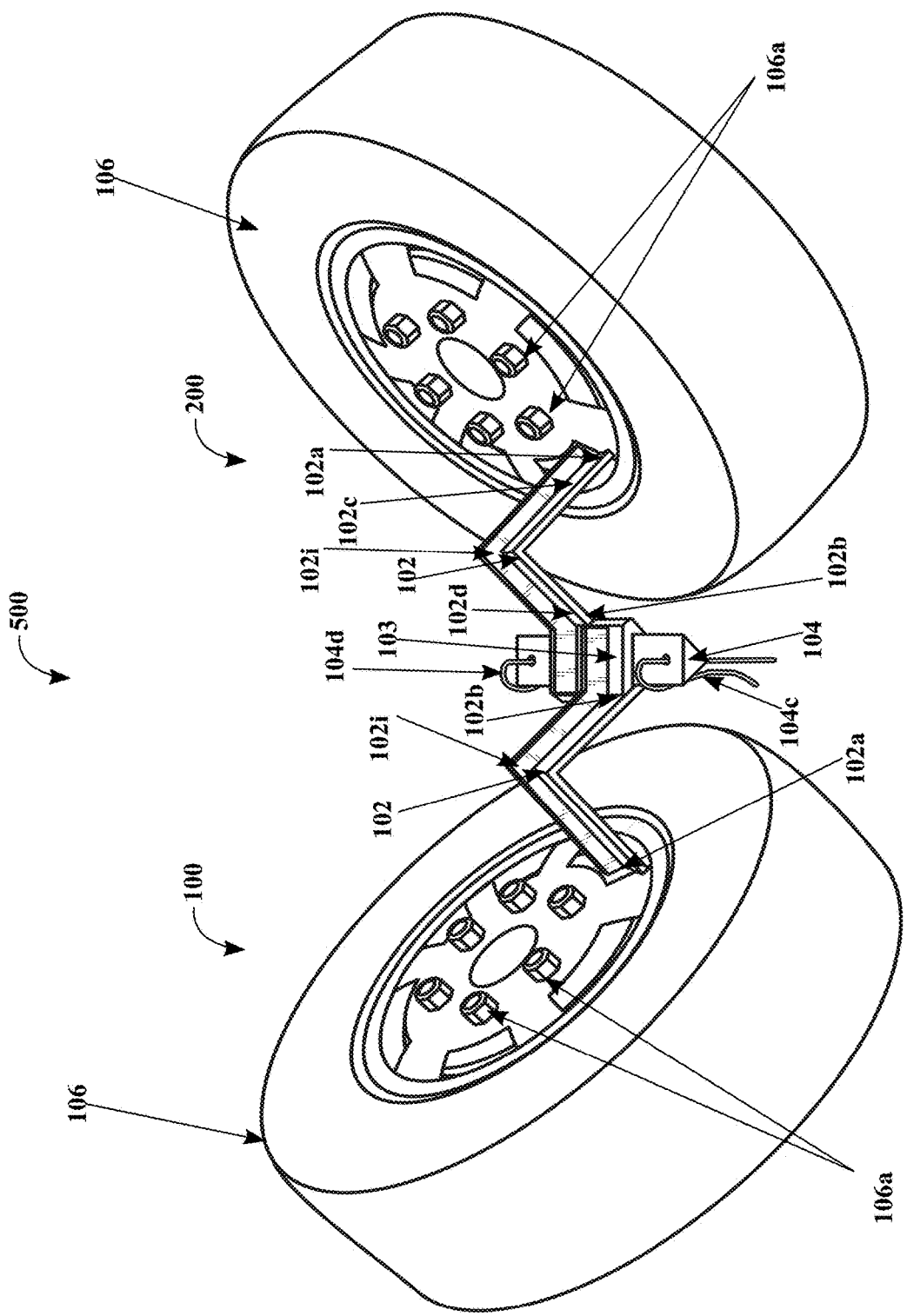
FIG. 8 illustrates a view of a rod member slidably inserted into the aligned channels of the first wheel stand and the second wheel stand.

FIG. 8 illustrates a view of a rod member 104 slidably inserted into the aligned channel 103a of the first wheel stand 100 and the aligned channel (not shown) of the second wheel stand 200. As exemplarily illustrated in FIG. 8, once the channel 103a of the first wheel stand 100 is aligned with the channel (not shown) of the second wheel stand 200, the rod member 104 is slidably inserted into the channels 103a of the first wheel stand 100 and the second wheel stand 200 to lock the first wheel stand 100 and the second wheel stand 200 in an aligned position. The first retaining pin 104e and the second retaining pin 104f are inserted into the first hole 104c and the second hole 104d, respectively to prevent slipping of the rod member 104 from the the channel 103a of the first wheel stand 100 and the channel (not shown) of the second wheel stand 200.

Figure 15:
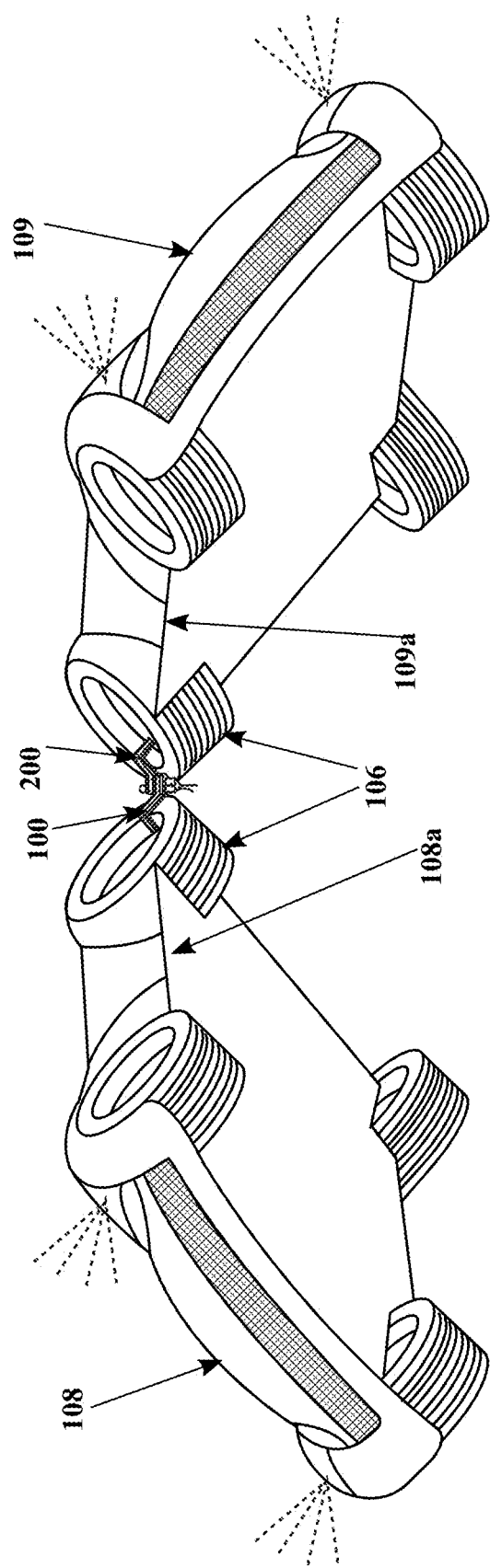
FIG. 15 illustrates a front view of an alternate embodiment of displaying the first vehicle and the second vehicle.

As illustrated in FIG. 8, a single vehicle-to-vehicle connector assembly 500 is used to stylistically display two inclined vehicles 108 and 109 side by side of each other by attaching the first wheel stand 100 to a wheel hub 105 of the first inclined vehicle 108, attaching the second wheel stand 200 to a wheel hub 105 of the second inclined vehicle 109, and establishing a rigid connecting between the first and second wheel stands 100 and 200. In this embodiment, either the front and rear wheel hubs 105 on the inclined side 108a of the first inclined vehicle 108 are in-line with the front and rear wheel hubs 105 on the inclined side 109a of the second inclined vehicle 105, or the rear and front wheel hubs 105 on the inclined side 108a of the first inclined vehicle 108 are in-line with the front and rear wheel hubs 105 on the inclined side 109a of the second inclined vehicle 109, as exemplarily illustrated in FIG. 15. In an embodiment, as shown in FIG. 15, the first inclined vehicle 108 and the second inclined vehicle 109 face the same direction. The vehicle-to-vehicle connector assembly 500 is used to connect either the front wheel hubs 105 or the rear wheel hubs 105 on the inclined sides 108a and 109a of the first inclined vehicle 108 and the second inclined vehicle 109. In another embodiment, the first inclined vehicle 108 faces a direction opposite to the direction of the second inclined vehicle 109 and the vehicle-to-vehicle connector assembly 500 connects the rear wheel hub 105 on the inclined side 108a of the first inclined vehicle 108 with the front wheel hub 105 on the inclined side 109a of the second inclined vehicle 109. Alternatively, the vehicle-to-vehicle connector assembly 500 is used to connect the front wheel hub 105 on the inclined side 108a of the first inclined vehicle 108 with the rear wheel hub 105 on the inclined side 109a of the second inclined vehicle 109.

Figure 16:
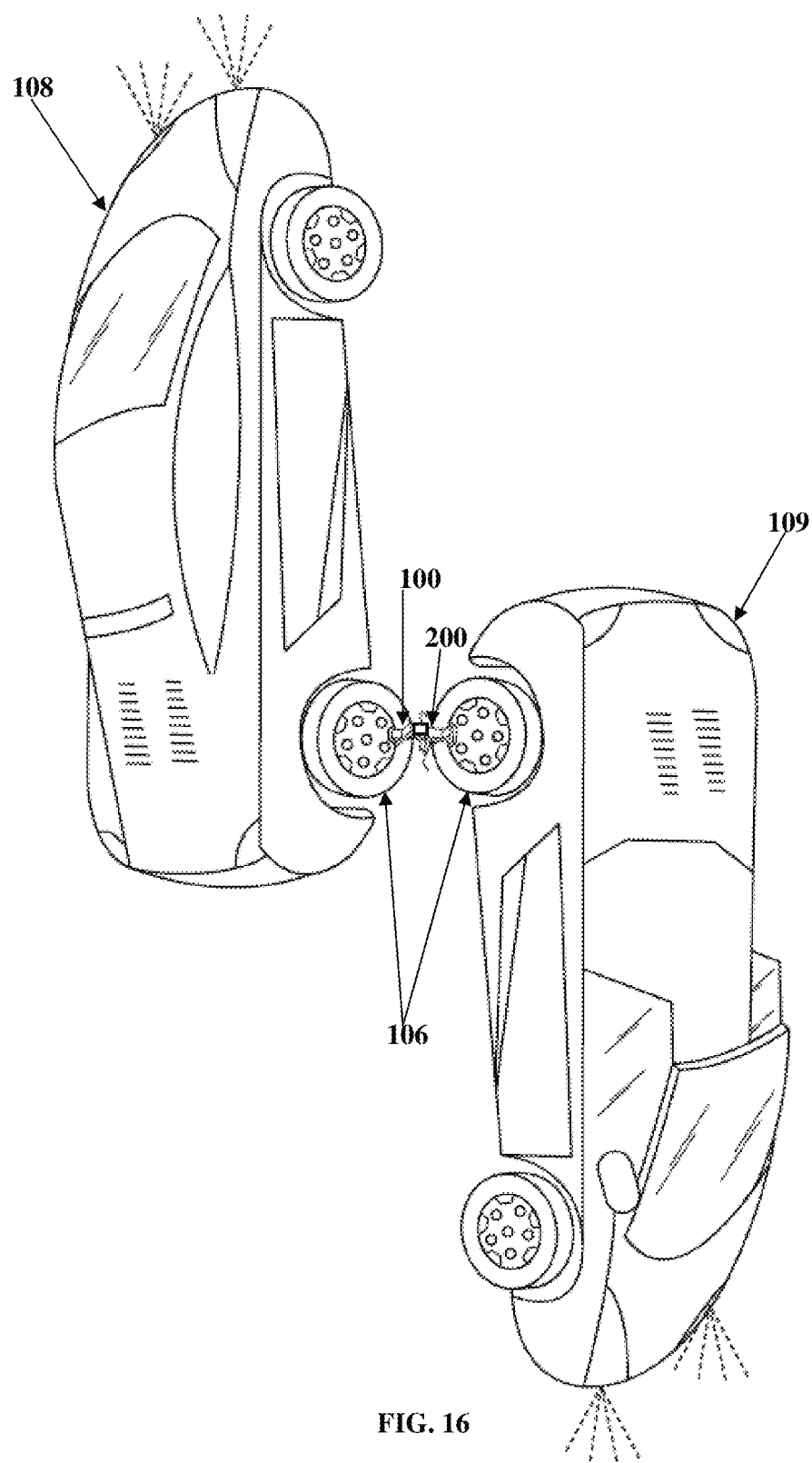
FIG. 16 illustrates a top view of another alternate embodiment of displaying the first vehicle and the second vehicle that are offset from each other.

In another embodiment, as shown in FIG. 16, a single vehicle-to-vehicle connector assembly 500 is used to stylistically display two inclined vehicles 108 and 109 that are offset from each other. As used herein offset refers to the position of the first and second inclined vehicles 108 and 109 where either the front wheel hub 105 or rear wheel hub 105 on the inclined side 108a of the first vehicle 108 is in-line with either the rear wheel hub 105 or front wheel hub 105, respectively, on the inclined side 109a of the second vehicle 109. In an embodiment, the first inclined vehicle 108 and the second inclined vehicle 109 face the same direction with the front wheel hub 105 on the inclined side 108a of the first vehicle 108 in-line with the rear wheel hub 105 on the inclined side 109a of the second vehicle 109. The vehicle-to-vehicle connector assembly 500 is used to connect the front wheel hub 105 on the inclined side 108a of the first vehicle 108 with the rear wheel hub 105 on the inclined side 109a of the second vehicle 109. In another embodiment, the front wheel hub 105 on the inclined side 109a of the second vehicle 109 is in-line with the rear wheel hub 105 on the inclined side 108a of the first vehicle 108. The vehicle-to-vehicle connector assembly 500 is used to connect the front wheel hub 105 on the inclined side 109a of the second vehicle 109 with the rear wheel hub 105 on the inclined side 108a of the first vehicle 108.

In another embodiment, as shown in FIG. 16, the first and second inclined vehicles 108 and 109 that are offset from each other face opposite directions. In an embodiment, the front wheel hub 105 on the inclined side 108a of the first vehicle 108 is in-line with the front wheel hub 105 on the inclined side 109a of the second vehicle 109, and the vehicle-to-vehicle connector assembly 500 is used to connect the front wheel hub 105 on the inclined side 108a of the first vehicle 108 with the front wheel hub 105 on the inclined side 109a of the second vehicle 109. In another embodiment, the rear wheel hub 105 on the inclined side 109a of the second vehicle 109 is in-line with the rear wheel hub 105 on the inclined side 108a of the first vehicle 108, and the vehicle-to-vehicle connector assembly 500 is used to connect the rear wheel hub 105 on the inclined side 109a of the second vehicle 109 with the rear wheel hub 105 on the inclined side of the first vehicle 108.

Figure 9:
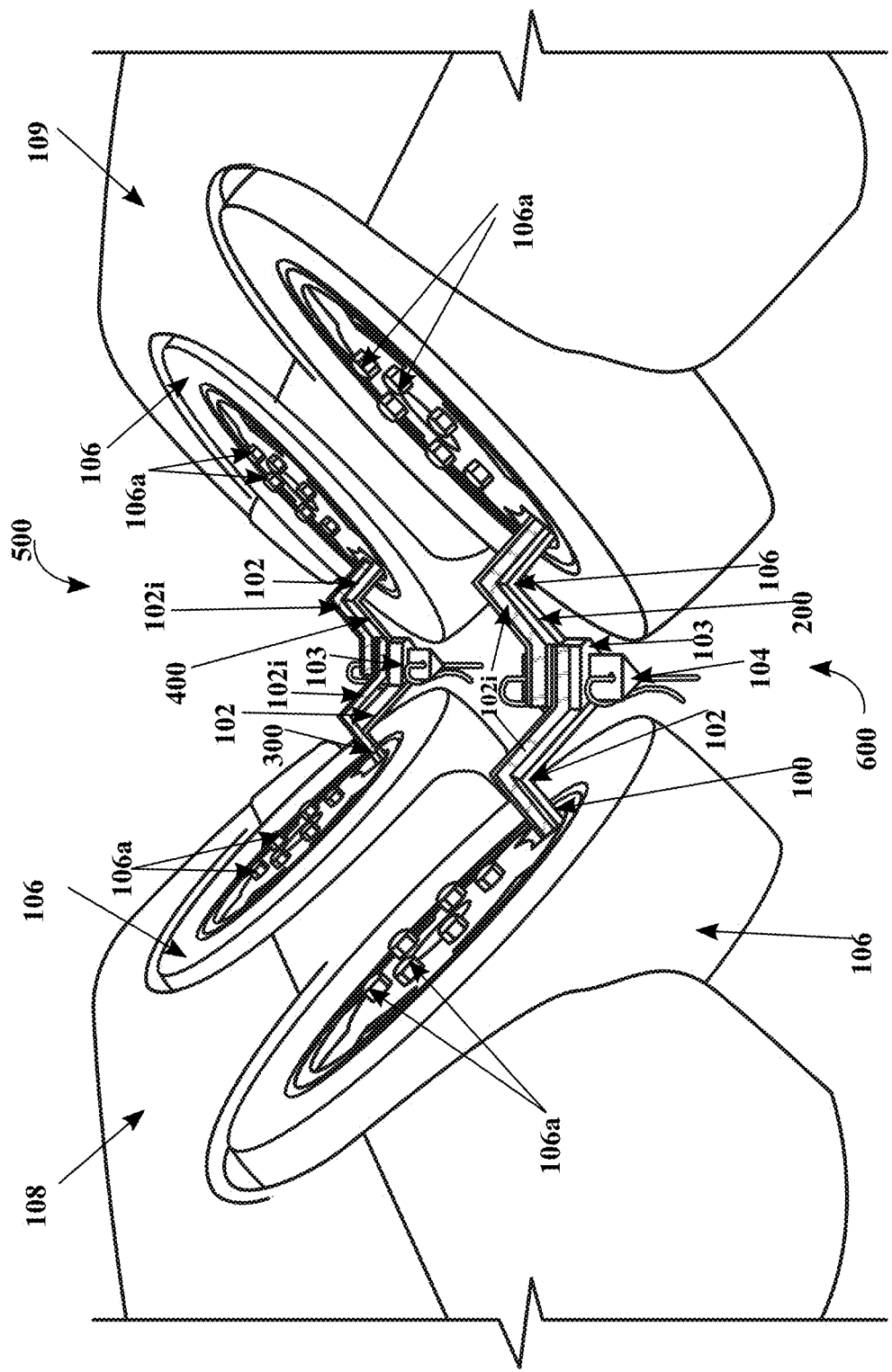
FIG. 9 illustrates a view of multiple wheel stands for connecting the wheel hubs on an inclined side of a first vehicle with the wheel hubs on an inclined side of a second vehicle.

FIG. 9 illustrates a view of multiple wheel stands 100, 200, 300, and 400 for connecting the wheel hubs 105 on an inclined side of the first vehicle 108 with the wheel hubs 105 on an inclined side of the second vehicle 109.

Figure 10A:
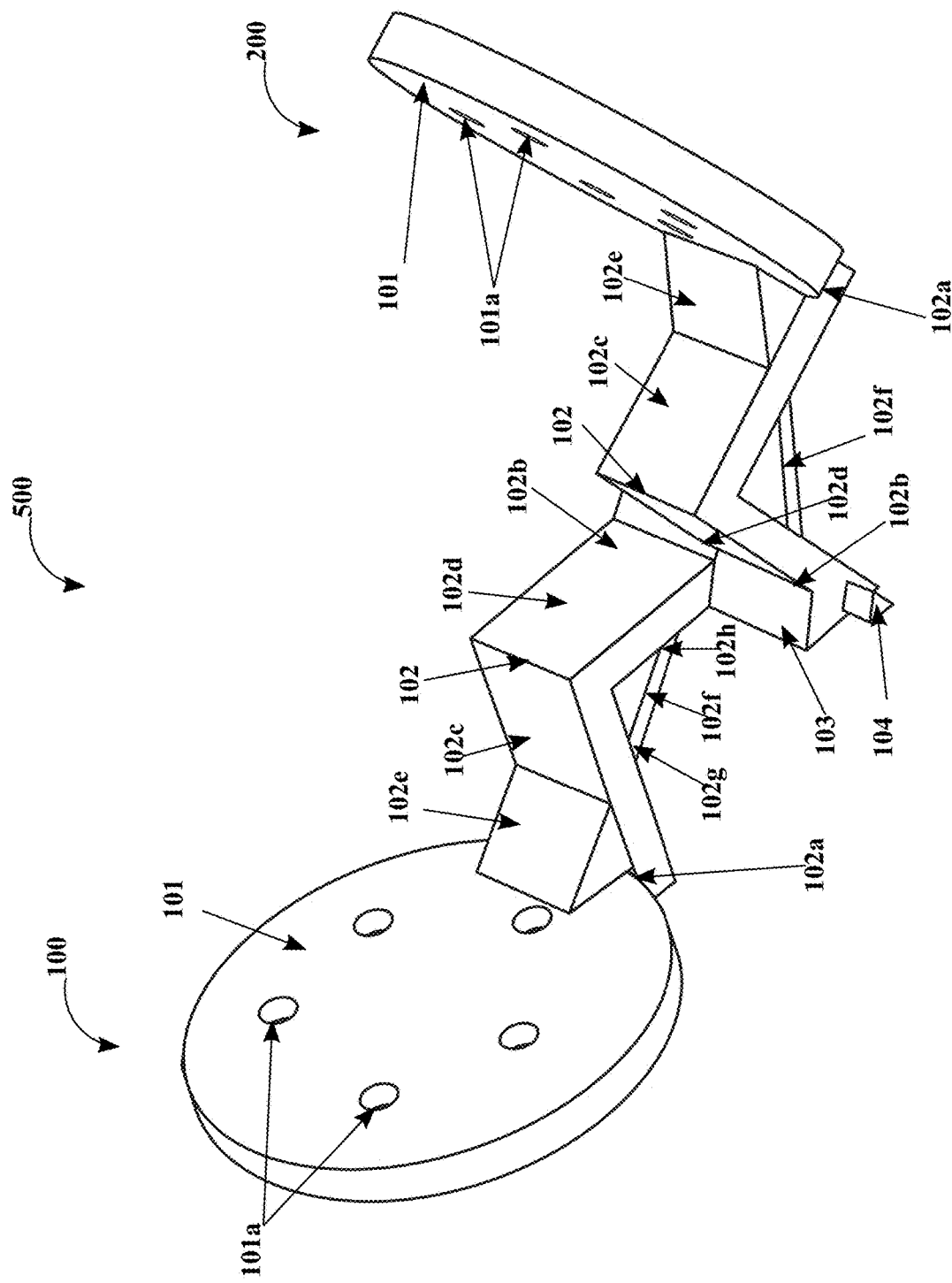
FIG. 10A illustrates a perspective view of an embodiment of the vehicle-to-vehicle connector assembly where the first wheel stand and the second wheel stand comprise reinforcement members.
Figure 10B:
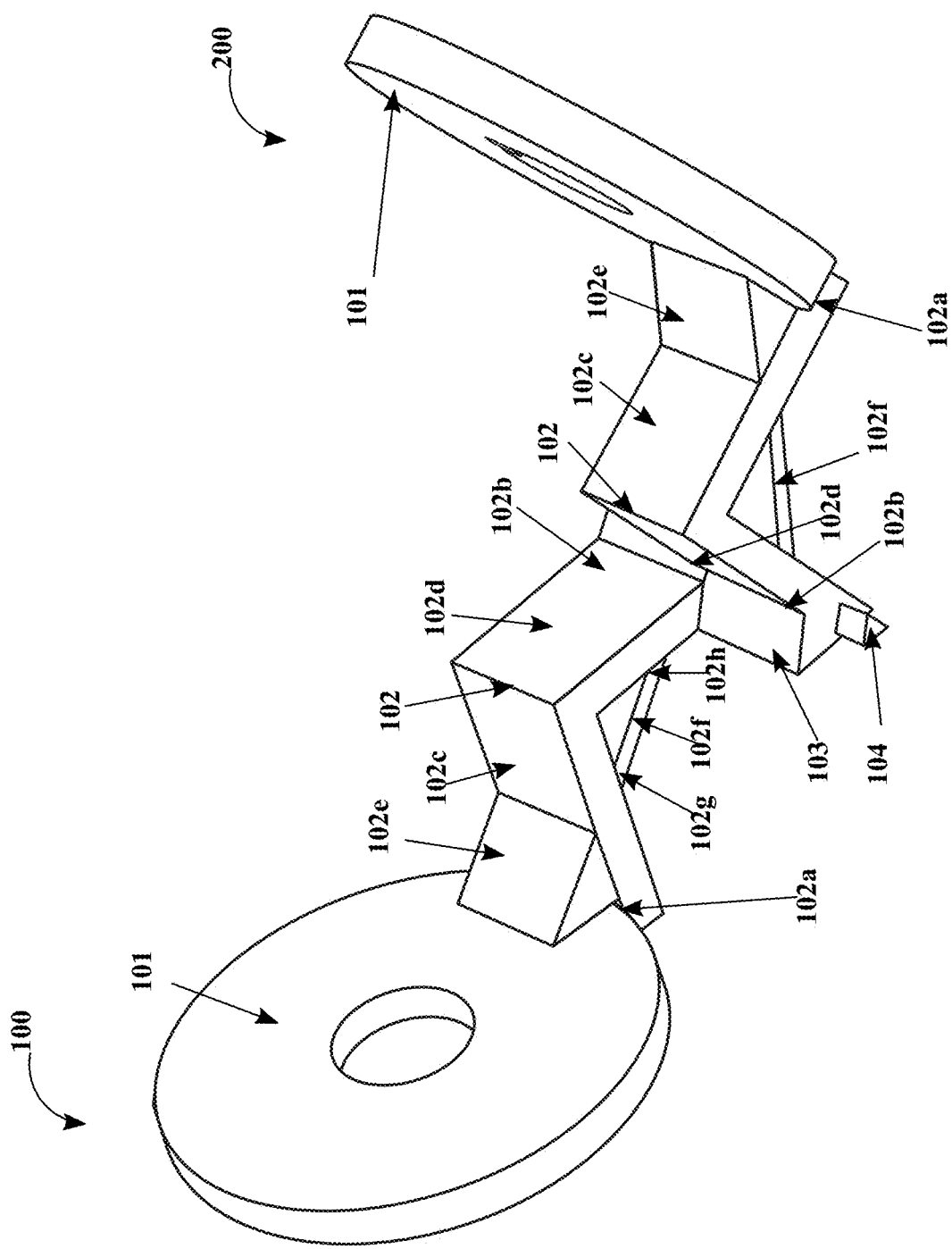
FIG. 10B illustrates a perspective view of another embodiment of the vehicle-to-vehicle connector assembly where the first wheel stand and the second wheel stand comprise reinforcement members.
Figure 11:
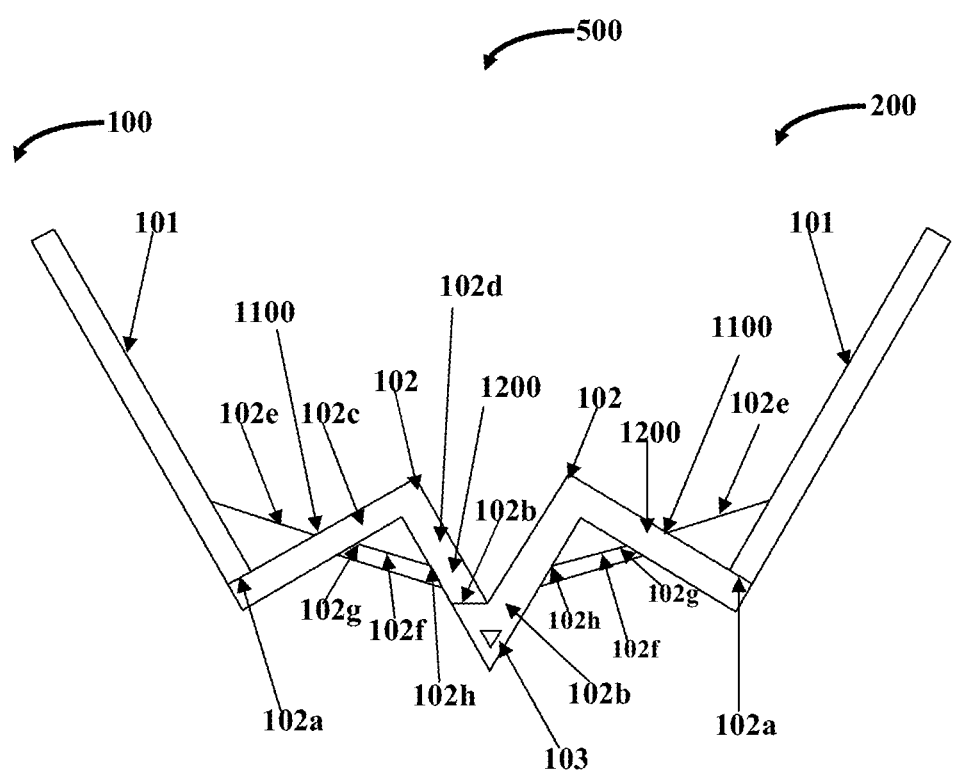
FIG. 11 illustrates a front view of the first wheel stand and a second wheel stand with reinforcement members.

FIG. 10A illustrates a perspective view of an embodiment of the vehicle-to-vehicle connector assembly 500 comprising wheel hub attachments 101 having multiple holes 101a, where the first wheel stand 100 and the second wheel stand 200 comprise reinforcement members 102e, 102f. FIG. 10B illustrates a perspective view of another embodiment of the vehicle-to-vehicle connector assembly 500 comprising wheel hub attachments 101 having a central hole 101b where the first wheel stand 100 and the second wheel stand 200 comprise reinforcement members 102e, 102f. FIG. 11 illustrates a front view of first wheel stand 100 and a second wheel stand 200 with reinforcement members 102e, 102f. As exemplarily illustrated in FIG. 11, each of the first wheel stand 100 and the second wheel stand 200 comprises a first reinforcement member 102e attached between the first leg 102c and the wheel hub attachment 101. The first wheel stand 100 and the second wheel stand 200 also comprise a second reinforcement member 102f comprising a first end 102g and a second end 102h. The first end 102g of the second reinforcement member 102f is attached proximal to a mid-point 1100 of the first leg 102c and the second end 102h of the second reinforcement member 102f is attached proximal to a mid-point 1200 of the second leg 102d. In an embodiment, the point of attachment of the first end 102g of the second reinforcement member 102f is determined based on several factors comprising type of vehicle, size of gap 107a between the spokes 107 of the wheel 106 through which the bracket 102 of the wheel stand 100 protrudes. Accordingly, the point of attachment of the first end 102g of the second reinforcement member 102f is customized. Therefore, in an embodiment, the point of attachment of the first end 102g of the second reinforcement member 102f is located before the mid-point 1100 of the first leg 102c. Similarly, the point of attachment of the second end 102h of the second reinforcement member 102f is also customised. In the embodiments shown in FIGS. 10A and 10B, the first leg 102c and the second leg 102d have a rectangular cross-section instead of having an inverted T-shaped cross-section, as shown in FIGS. 1-3. The structural strength and rigidity for the wheel stand 100 is provided by the first reinforcement member 102e and the second reinforcement member 102f.

Figure 12A:
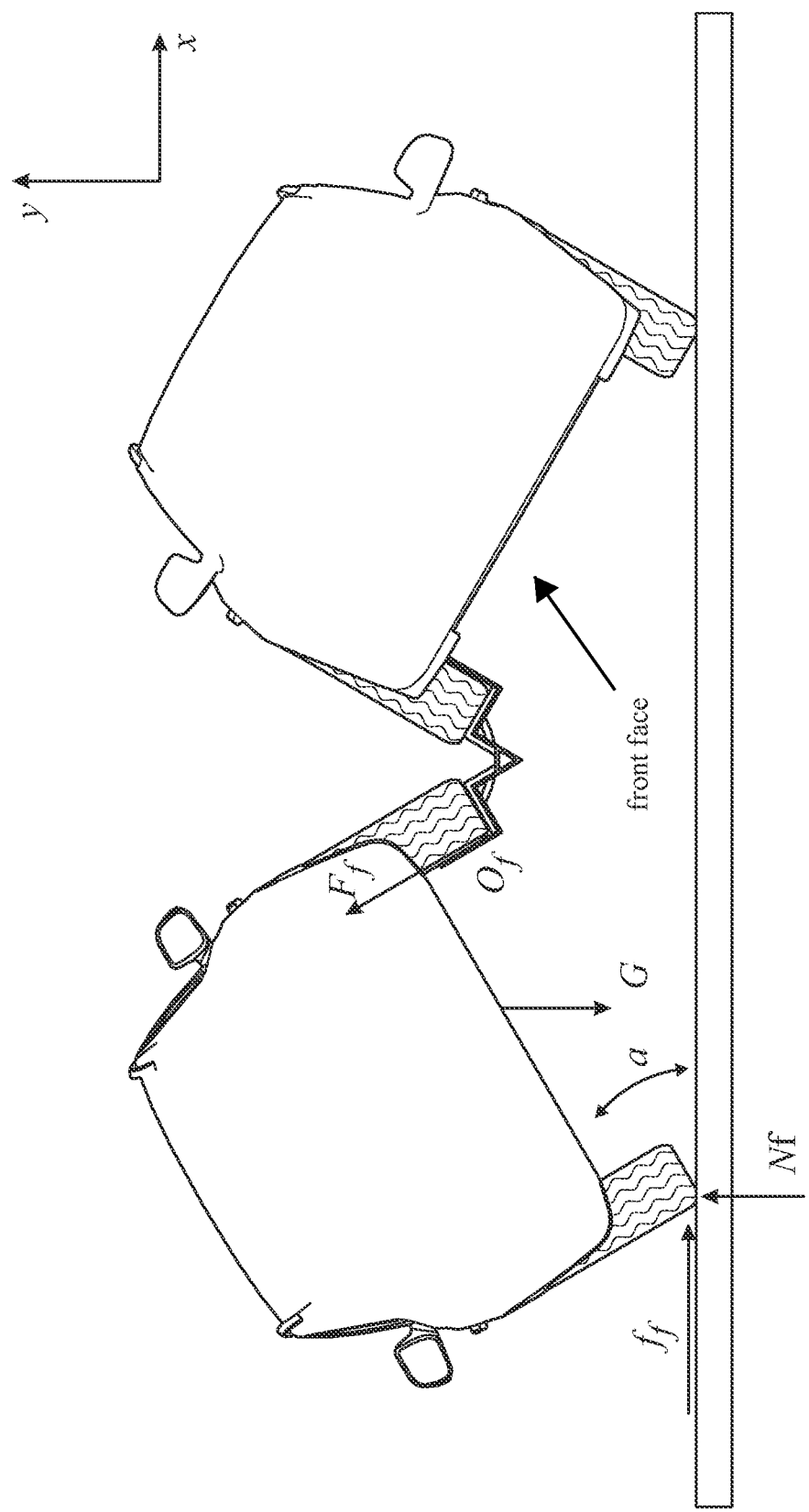
FIGS. 12A exemplarily illustrates a front view of two vehicles showing torque and load acting on the vehicles.
Figure 12B:
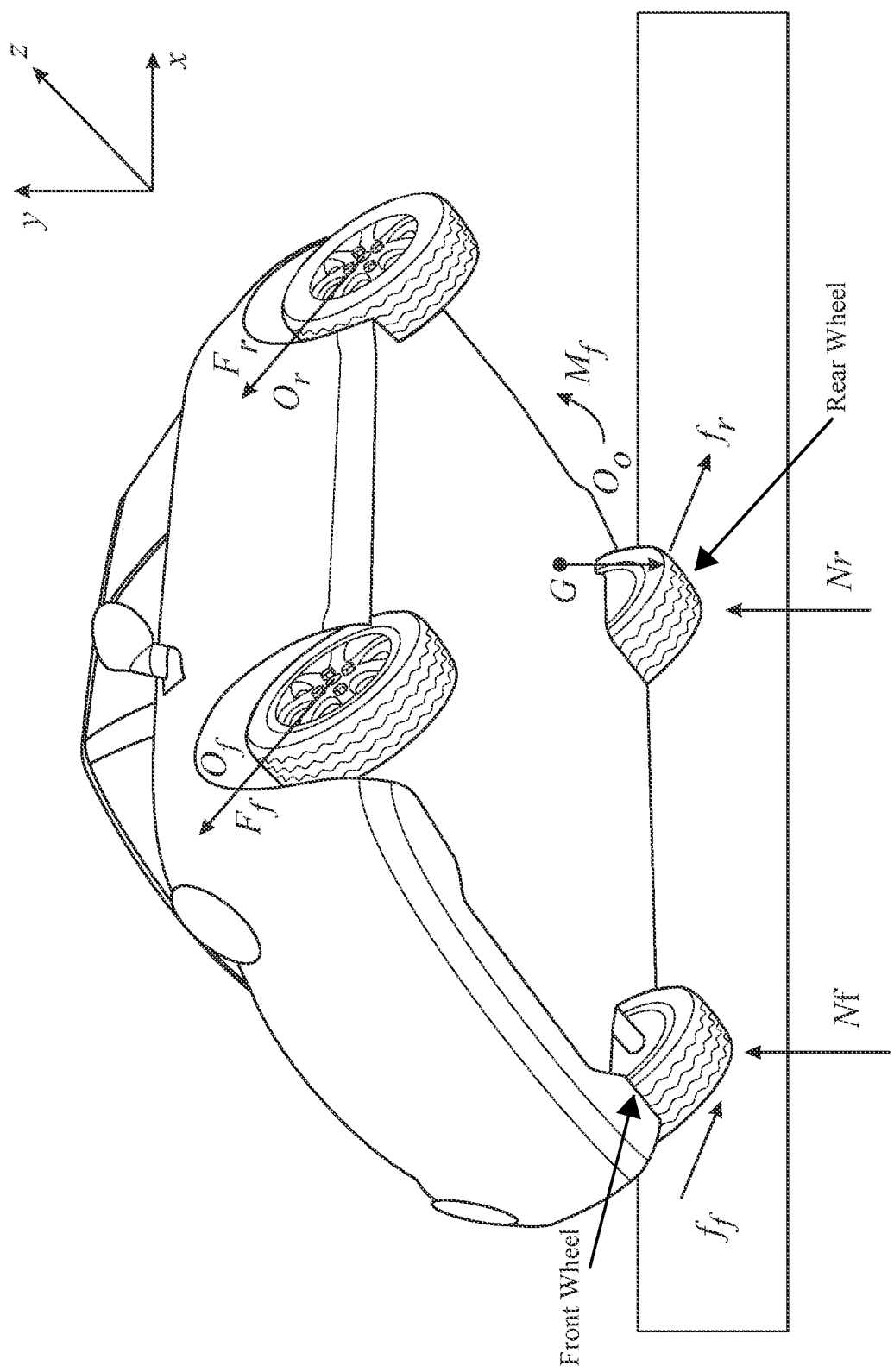
FIG. 12B exemplarily illustrates a perspective view of vehicle showing torque and load acting on the vehicle.

FIG. 12A exemplarily illustrates a front view of two vehicles showing load acting on the vehicles. FIG. 12B exemplarily illustrates a perspective view of a vehicle showing both torque and load acting on the vehicle 108 or 109.

Assuming L is the wheelbase and W is the width, the forces acting on the vehicles 108 or 109 comprises vehicle gravity force (G), a support force from the ground acting on a front tire ($N_f$) of the vehicle 108 or 109 that is not connected to the wheel stand 100 or 200, the support force from the ground acting on a rear tire of the vehicle ($N_r$) 108 or 109 that is not connected to the wheel stand 100 or 200, a structure force, from the wheel stand 100 or 200, acting on a front tire ($F_f$) of the vehicle 108 or 109, the structure force, from the wheel stand 100 or 200, acting on a rear tire ($F_r$) of the vehicle 108 or 109, a friction force acting between the ground and the front tire ($f_f$) of the vehicle 108 or 109 that is not connected to the wheel stand 100 or 200, the friction force acting between the ground and the rear tire ($f_r$) of the vehicle 108 or 109 that is not connected to the wheel stand 100 or 200. When the vehicle is inclined, there is an angle between the ground and the vehicle, which is represented as α, as exemplarily illustrated in FIG. 12A.

In static equilibrium, the vector sum of the forces acting on the x-direction of the vehicle 108 or 109 is zero, as shown in the equation below. Likewise, in static equilibrium, the vector sum of the forces acting on the y-direction of the vehicle 108 or 109 is zero, as shown in the equation below.

$$F_f \cos\alpha + F_r \cos\alpha - f_f - f_r = 0$$

$$G - N_f - N_r - F_f \sin\alpha - F_r \sin\alpha = 0$$

In rotational equilibrium, the sum of the torques of all forces acting on the front wheel ($O_f$) of vehicle 108 or 109 is equal to zero, as shown below:

$$\Sigma O_f = \vec{F_r} \times \vec{O_r O_f} + \vec{N_r} \times \vec{BO_f} + \vec{N_f} \times \vec{AO_f} + \vec{f_f} \times \vec{AO_f} \times \vec{f_r} \times \vec{BO_f} + \vec{F_f} \times \vec{O_f O_f} + \vec{G} \times \vec{O_o O_f} + \vec{M_f} = 0$$

Figure 12C:
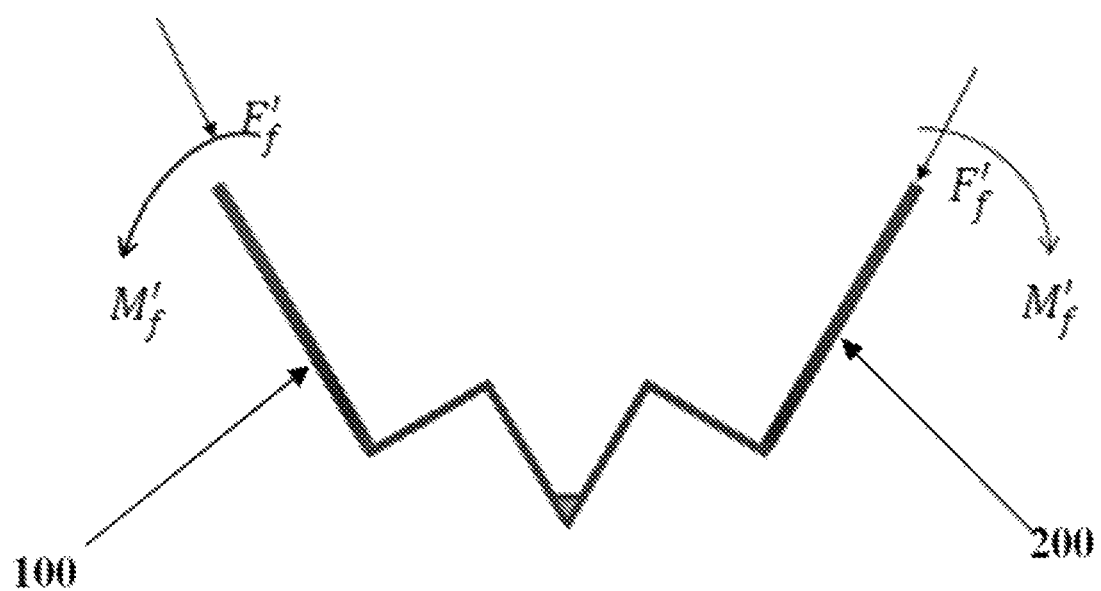
FIG. 12C exemplarily illustrates torque from the wheel of the vehicle acting on the wheel stand.

Where:

$\vec{F_r}$ is the vector of $F_r$, $\vec{F_r} = (-F_r \sin\alpha, F_r \cos\alpha, 0)$;

$\vec{O_r O_f}$ is the force distance of $F_r$ acting on the front wheel of vehicle 108, $\vec{O_r O_f} = (0, 0, -L)$;

$\vec{N_r}$ is the vector of $N_r$, $\vec{N_r} = (0, N_r, 0)$;

$\vec{BO_f}$ is the force distance of $N_r$ acting on the front wheel of the vehicle, $\vec{BO_f}=(W\cos\alpha, W\sin\alpha, -L)$;

$\vec{N_f}$ is the vector of $N_f$, $\vec{N_f}=(0, N_f, 0)$;

$\vec{AO_f}$ is the force distance of $N_f$ acting on the front wheel of the vehicle, $\vec{AO_f}=(W\cos\alpha, W\sin\alpha, 0)$;

$\vec{f_f}$ is the vector of $f_f$, $\vec{f_f}=(f_f, 0, 0)$;

$\vec{f_r}$ is the vector of $f_r$, $\vec{f_r}=(f_r, 0, 0)$;

$\vec{F_f}$ is the vector of $F_f$, $\vec{F_f}=(-F_f\sin\alpha, F_f\cos\alpha, 0)$;

$\vec{O_fO_f}$ is the force distance of $F_f$ acting on the front wheel of vehicle 108, $\vec{O_fO_f}=(0,0,0)$;

$\vec{G}$ is the vector of G, $\vec{G}=(0, -G, 0)$;

$\vec{O_oO_f}$ is the force distance of G acting on the front wheel of vehicle 108, $\vec{O_oO_f}=(0.5*W\cos\alpha, 0.5*W\sin\alpha, -0.5 * L)$ Further the support forces ($N_f$ and $N_r$), the friction forces ($f_f$ and $f_r$) and the structure forces ($F_f$ and $F_r$) acting on both the front tire and the rear tire of the vehicle 108 or 109 are equal. Additionally, $\vec{M_f}$ is the torque from the wheel stand 100 or 200, acting on the front wheel of the vehicle. $\vec{M'_f}$ is the torque from the front wheel of the vehicle, acting on the wheel stand 100 or 200, as exemplarily illustrated in FIG. 12C. In accordance to Newton's third law of motion, action and reaction are equal and opposite. Based on the above, we have the four equations as shown below:

$f_f=f_r$;

$N_f=N_r$;

$F_f=F_r$;

$\vec{M_f}=-\vec{M'_f}$

Further, the relationship between the friction forces ($f_f$ or $f_r$) and the pressure acting on the vehicle 108 or 109 is shown below, where $\mu$ is the friction factor, $N_f$ is the support from the ground:

$f_f=\mu N_f$

Thereby, combining the sum of the forces and the torque acting on the vehicles 108 or 109 using the above derived relationships as shown below:

$$F_f = \frac{\mu G}{2(1 + \mu\tan\alpha)\cos\alpha}$$

$$N_f = \frac{G}{2(1 + \mu\tan\alpha)}$$

$$f_f = \frac{\mu G}{2(1 + \mu\tan\alpha)}$$

$\vec{M_f} = (F_rL\cos\alpha + N_rL - 0.5*GL, F_rL\sin\alpha -$
$f_rL, (N_r + N_f)W\cos\alpha - (f_f + f_r)W\sin\alpha - 0.5*GW\cos\alpha)$ In an embodiment, when the brake systems of the vehicles 108 or 109 are engaged, they lock the wheels in place and ensure that the vehicle doesn't roll away. Then the torque in the x direction acting on the vehicle 108 or 109 is equal to zero.

The forces and torque for each vehicle is different based on the weight, wheelbase and width. The structure of the wheel stand 100 can be further refined by adding reinforcements to areas such as connection points of the wheel hub attachment 101 and the bracket 102, where reinforcement members 102e and 102f are added.

Figure 13:
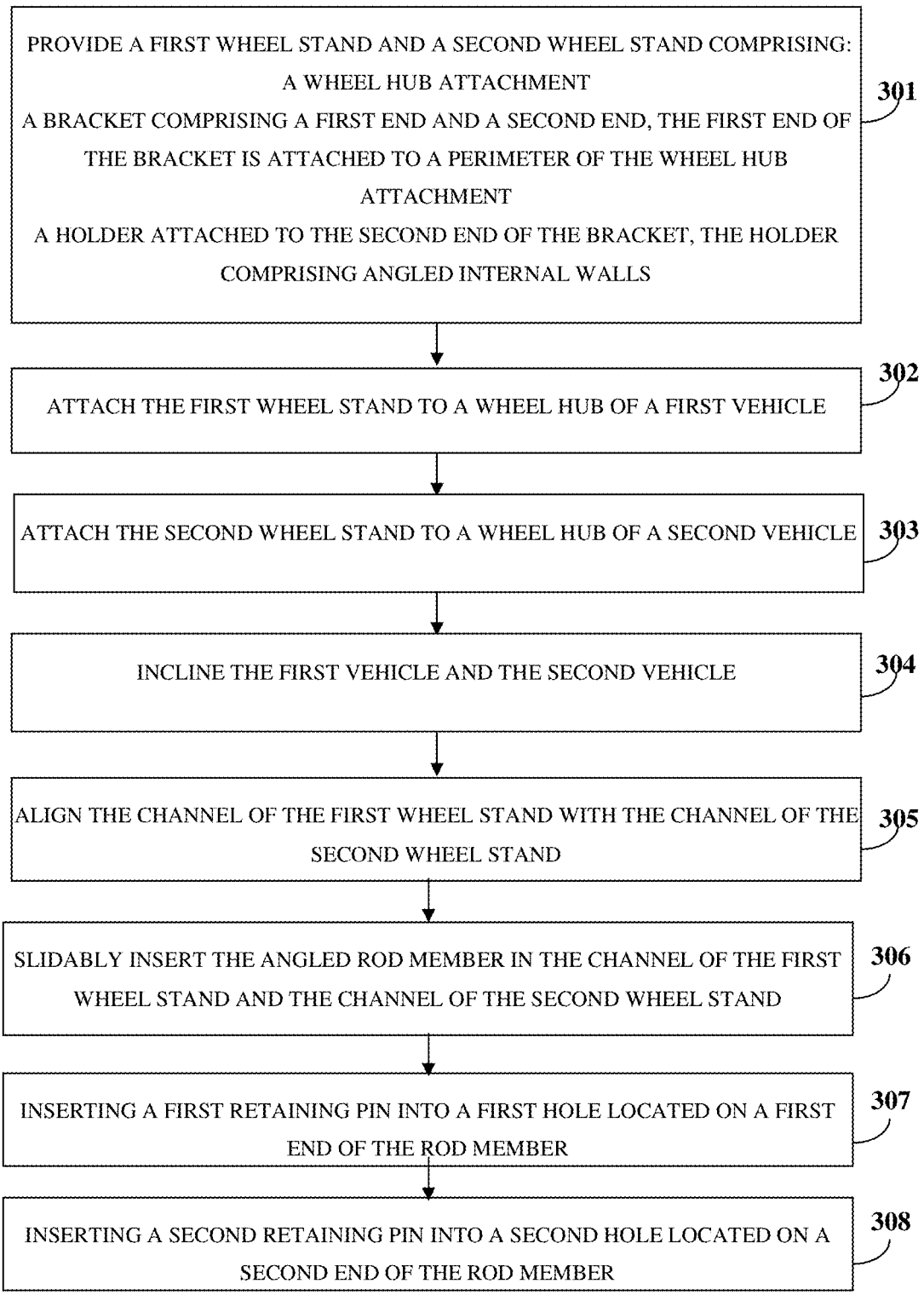
FIG. 13 illustrates a method for displaying vehicles in an inclined configuration.

FIG. 13 illustrates a method for displaying vehicles in an inclined configuration. As exemplarily illustrated in FIG. 13, the method provides 301 a first wheel stand 100, and a second wheel stand 200. Here, as shown in FIGS. 1 and 2, each of the first wheel stand 100 and the second wheel stand 200 comprises a wheel hub attachment 101, a bracket 102 and a holder 103. The bracket 102 comprises a first end 102a and a second end 102b. The first end 102a of the first bracket 102 is attached to a perimeter of the wheel hub attachment 101 and the holder 103 is attached to the second end 102b of the bracket 102. The holder 103 comprises a channel 103a comprising angled internal walls.

The first wheel stand 100 is attached 302 to a wheel hub 105 of a first vehicle, say, for example 108, as exemplarily shown in FIGS. 5B and 6B. The second wheel stand 200 is attached 303 to a wheel hub 105 of a second vehicle, say, for example 109, as exemplarily shown in FIGS. 5B and 6B. The wheel hub 105 of the first vehicle 108 is, for example, the left side rear wheel hub 105, as exemplarily shown in FIG. 15. The wheel hub of the second vehicle 109 is, for example, the right side rear wheel hub 105, as exemplarily shown in FIG. 15. A wheel mounted on the left side rear wheel hub 105 of the first vehicle 108 is removed prior to attaching the first wheel stand 100 to the wheel hub 105 of the first vehicle 108, as exemplarily shown in FIGS. 5A and 6A. Similarly, a wheel 106 mounted on the right side rear wheel hub 105 of the second vehicle 109 is removed prior to attaching the second wheel stand 200 to the wheel hub 105 of the second vehicle 109, as exemplarily shown in FIGS. 5A and 6A. The wheels 106 are mounted on top of the first wheel stand 100 and the second wheel stand 200 after attaching the first wheel stand 100 and the second wheel stand 200 to the wheel hub 105 of the first vehicle 108 and the wheel hub 105 of the second vehicle 109. The wheels 106 are secured to the wheel hubs 105 using lug nuts 106a, as exemplarily shown in FIGS. 5C and 6C.

The first vehicle 108 and the second vehicle 109 are inclined 304 by using one or more jack devices (not shown) to lift the side of the first vehicle 108 and the side of the second vehicle 109 where the first wheel stand 100 and the second wheel stand 200 are attached. The channel 103a of the first wheel stand 100 is aligned 305 with the channel (not shown) of the second wheel stand 200, as exemplarily shown in FIGS. 4 and 7. Further, the angled rod member 104 is slidably inserted 306 into the channel 103a of the first wheel stand 100 and the channel (not shown) of the second wheel stand 200, as exemplarily shown in FIG. 8. The first retaining pin 104e and the second retaining pin 104f are inserted 307 and 308 into the first hole 104c and the second hole 104d, as exemplarily shown in FIG. 8, respectively to prevent slipping of the rod member 104 from the the channel 103a of the first wheel stand 100 and the channel (not shown) of the second wheel stand 200.

In an embodiment, the vehicle-to-vehicle connector assembly 500 is attached to the wheel hubs of the inclined first vehicle 108 and the inclined second vehicle 109. In another embodiment, the first wheel stand 100 and the second wheel stand 200 of the vehicle-to-vehicle connector assembly 500 are individually attached to the wheel hub 105 of the first vehicle 108 and the second vehicle 109 prior to inclining the first and second vehicles 108 and 109 and connect the first wheel stand 100 and the second wheel stand 200 using the rod member 104. In another embodiment, the first vehicle 108 and the second vehicle 109 are inclined prior to attaching the first wheel stand 100 to the wheel hub 105 of the first vehicle 108 and the wheel hub 105 of the second vehicle 109, and the first wheel stand 100 and the second wheel stand 200 are connected using the rod member 104.

In an embodiment, as exemplarily illustrated in FIG. 9,the wheel stands 100 and 200 are attached to, for example, the left side front wheel hub 105 of the first vehicle 108 and the right side front wheel hub 105 of the second vehicle 109, respectively. A wheel mounted on the left side front wheel hub 105 of the first vehicle 108 is removed prior to attaching the wheel stand 300 to the wheel hub 105 of the first vehicle 108. Similarly, a wheel 106 mounted on the right side front wheel hub 105 of the second vehicle 109 is removed prior to attaching the wheel stand 400 to the wheel hub 105 of the second vehicle 109. The wheels 106 are mounted on top of the wheel stand 300 and the wheel stand 400 after attaching the wheel stand 300 and the wheel stand 400 to the wheel hub 105 of the first vehicle 108 and the wheel hub 105 of the second vehicle 109. The wheels 106 are secured to the wheel hubs 105 using lug nuts 106a. Similarly, another pair of the wheel stands comprising wheel stands 300 and 400 are attached to, for example, the left side rear wheel hub 105 of the first vehicle 108 and the right side rear wheel hub 105 of the second vehicle 109. Another angled rod member 104 is slidably inserted 306 into the channel (not shown) of the wheel stand 300 and the channel (not shown) of the wheel stand 400. Another pair of retaining pins comprising the first retaining pin 104e and the second retaining pin 104f are inserted into the first hole 104c and the second hole 104d, respectively to prevent slipping of the another angled rod member 104 from the the channel (not shown) of the wheel stand 300 and the channel (not shown) of the wheel stand 400.

Figure 14:
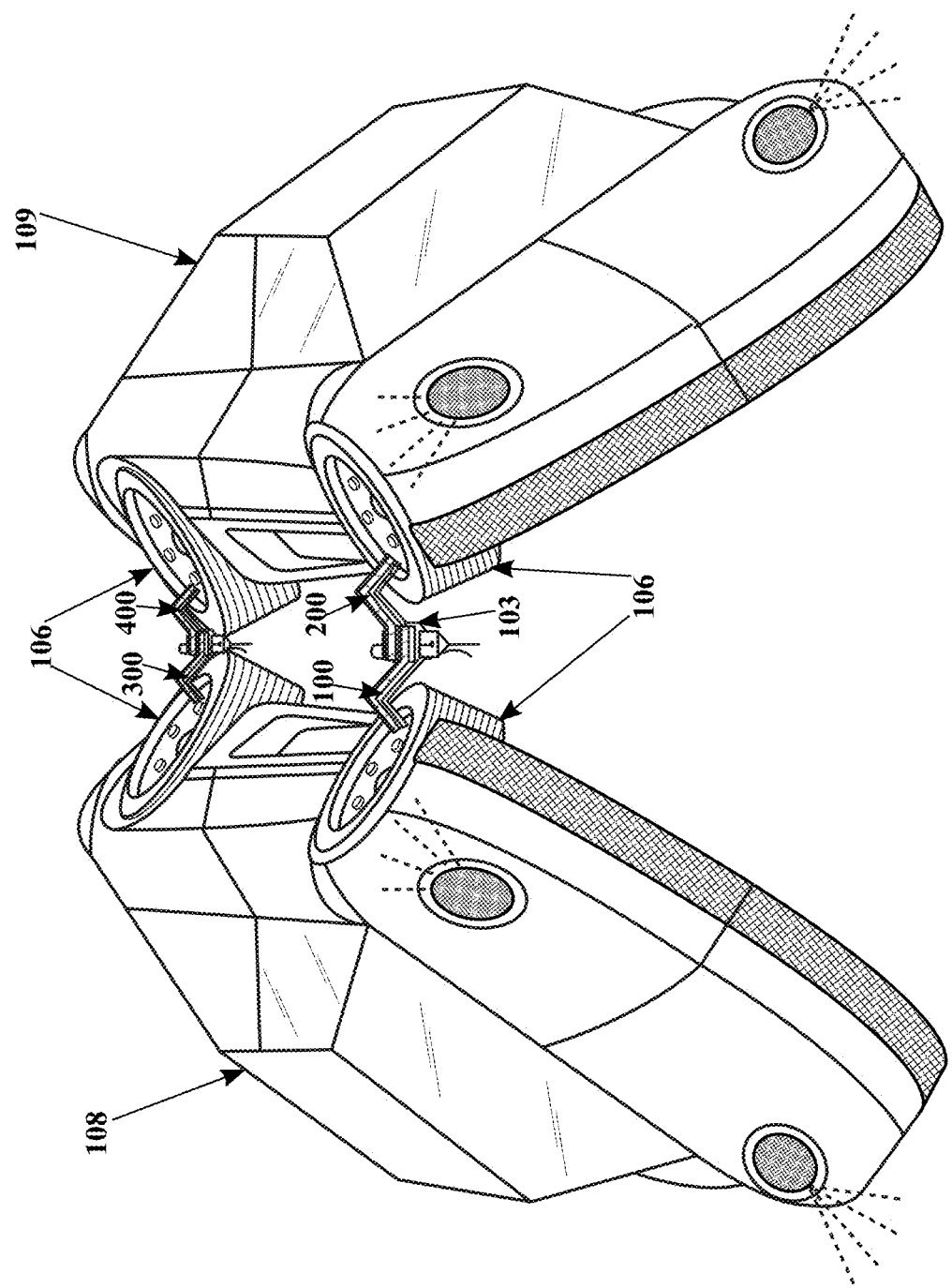
FIG. 14 illustrates a front perspective view showing the first vehicle and the second vehicle attached according to embodiment illustrated in FIG. 9.

The angled rod members104 hold the wheel stands 300 and 400 together to provide a stylistic display of vehicles 108, 109 in a trade show. The angled rod members 104 hold the wheel stands 300 and 400 are used for connecting and displaying two vehicles 108 and 109 together in an inclined configuration. FIG. 14 illustrates a front perspective view showing the first vehicle 108 and the second vehicle 109 attached according to embodiment illustrated in FIG. 9.

In another embodiment, as shown in FIG. 9 the first and second vehicles 108 and 109 are inclined side by side of each other prior to connecting the first inclined vehicle 108 and the second inclined vehicle 109 using two vehicle-to-vehicle connector assemblies 500 and 600. In an embodiment, the first inclined vehicle 108 and the second inclined vehicle 109 face the same direction, as shown in FIG. 14. The first vehicle-to-vehicle connector assembly 500 and the second vehicle-to-vehicle connector assembly 600 are used to connect the front wheel hubs 105 and the rear wheel hubs105, respectively, on the inclined sides 108a and 109a of the first inclined vehicle 108 and the second inclined vehicle 109.

In another embodiment, the first inclined vehicle 108 faces a direction opposite to the direction of the second inclined vehicle 109. The first vehicle-to-vehicle connector assembly 500 is used to connect the rear wheel hub 105 on the inclined side 108a of the first inclined vehicle 108 with the front wheel hub 105 on the inclined side 109a of the second inclined vehicle 109. The second vehicle-to-vehicle connector assembly 600 is used to connect the front wheel hub 105 on the inclined side 108a of the first inclined vehicle 108 with the rear wheel hub 105 on the inclined side 109a of the second inclined vehicle 109.

FIG. 15 illustrates a front view of an alternate embodiment of displaying the first vehicle 108 and the second vehicle 109. In this embodiment, the first wheel stand 100 is attached to the left side rear wheel hub 105 of the first vehicle 108 and the second wheel stand 200 is attached to the right side rear wheel hub 105 of the second vehicle 109. The first vehicle 108 and the second vehicle 109 are parked next to each other with the front of both the first vehicle 108 and the second vehicle 109 facing the same direction. Furthermore, the gap between the front of the first vehicle 108 and the second vehicle 109 is more compared to the gap between the rear of the first vehicle 108 and the second vehicle 109. The first vehicle 108 and the second vehicle 109 are then inclined by using one or more jack devices (not shown) to lift the side of the first vehicle 108 and the side of the second vehicle 109 where the first wheel stand 100 and the second wheel stand 200 are attached. The channel 103a of the first wheel stand 100 is aligned with the channel (not shown) of the second wheel stand 200. Further, the angled rod member 104 is slidably inserted into the channel 103a of the first wheel stand 100 and the channel (not shown) of the second wheel stand 200. The first retaining pin 104e and the second retaining pin 104f are inserted into the first hole 104c and the second hole 104d, respectively to prevent slipping of the rod member 104 from the the channel 103a of the first wheel stand 100 and the channel (not shown) of the second wheel stand 200.

FIG. 16 illustrates a top view of another alternate embodiment of displaying the first vehicle 108 and the second vehicle 109 that are offset from each other. In this embodiment, the first wheel stand 100 is attached to the right side rear wheel hub 105 of the first vehicle 108 and the second wheel stand 200 is attached to the right side rear wheel hub 105 of the second vehicle 109. The first vehicle 108 and the second vehicle 109 are parked parallel to each other by aligning the right side rear wheel the first vehicle 108 with the right side rear wheel of the second vehicle 109. The first vehicle 108 and the second vehicle 109 are then inclined by using one or more jack devices (not shown) to lift the side of the first vehicle 108 and the side of the second vehicle 109 where the first wheel stand 100 and the second wheel stand 200 are attached. The channel 103a of the first wheel stand 100 is aligned with the channel (not shown) of the second wheel stand 200. Further, the angled rod member 104 is slidably inserted into the channel 103a of the first wheel stand 100 and the channel (not shown) of the second wheel stand 200. The first retaining pin 104e and the second retaining pin 104f are inserted into the first hole 104c and the second hole 104d, respectively to prevent slipping of the rod member 104 from the the channel 103a of the first wheel stand 100 and the channel (not shown) of the second wheel stand 200.

The foregoing examples have been provided merely for explanation and are in no way to be construed as limiting of a method and a connection apparatus 100 for providing an inclined display of vehicles disclosed herein. While the method and the connection apparatus 100 have been described with reference to various embodiments, it is understood that the words, which have been used herein, are words of description and illustration, rather than words of limitation. Furthermore, although the method and the connection apparatus 100 have been described herein with reference to particular means, materials, and embodiments, the method and the connection apparatus 100 are not intended to be limited to the particulars disclosed herein;

rather, the method and the connection apparatus 100 extend to all functionally equivalent structures, methods and uses, such as are within the scope of the appended claims. While multiple embodiments are disclosed, it will be understood by those skilled in the art, having the benefit of the teachings of this specification, that the method and the connection apparatus 100 disclosed herein are capable of modifications and other embodiments maybe effected and changes maybe made thereto, without departing from the scope and spirit of the method and the connection apparatus 100 disclosed herein.

We claim:

1. A wheel stand comprising:
    a wheel hub attachment;
    a bracket comprising a first end and a second end, wherein said first end of said bracket is attached to a perimeter of said wheel hub attachment; and
    a holder attached to said second end of said bracket, wherein said holder comprises a tubular channel comprising angled internal walls, wherein said tubular channel is configured to receive a rod member comprising an angular cross-section, and wherein said rod member is configured to be slidably inserted in said tubular channel of said wheel stand.

2. The wheel stand of claim 1, wherein said wheel hub attachment is a circular shaped wheel hub attachment.

3. The wheel stand of claim 2, wherein said circular shaped wheel hub attachment comprises a plurality of holes constructed as circular cross-section bores, wherein said plurality of holes are located along a circular path, wherein said circular path is concentric to the circular shaped wheel hub attachment.

4. The wheel stand of claim 1, wherein said wheel hub attachment comprises a central hole.

5. The wheel stand of claim 4, wherein said wheel stand is configured to be mounted on a central hub lug located on a wheel hub of a vehicle by slidably inserting said central hub lug through said central hole.

6. The wheel stand of claim 1, wherein said internal walls of said tubular channel are internally angled.

7. The wheel stand of claim 1, wherein said bracket comprises a first leg attached substantially perpendicular to said perimeter of said wheel hub attachment.

8. The wheel stand of claim 7, wherein said bracket comprises a second leg connecting said first leg and said holder, wherein said second leg is connected to said first leg at an angle.

9. The wheel stand of claim 8, wherein said first leg and said second leg comprise an inverted T-shaped cross-section.

10. The wheel stand of claim 8, further comprising a first reinforcement member attached between said first leg and said wheel hub attachment.

11. The wheel stand of claim 10, further comprising a second reinforcement member comprising a first end and a second end, wherein said first end of said second reinforcement member is attached to a mid-point of said first leg and said second end of said second reinforcement member is attached to a mid-point of said second leg.

12. The wheel stand of claim 8, wherein said holder comprising said tubular channel is perpendicular to said second leg.

* * * * *